United States Patent
Wang et al.

(10) Patent No.: US 10,419,460 B2
(45) Date of Patent: Sep. 17, 2019

(54) METHOD AND SYSTEM FOR DETECTING ABNORMAL ONLINE USER ACTIVITY

(71) Applicant: OATH INC., New York, NY (US)

(72) Inventors: Liang Wang, San Jose, CA (US); Angus Xianen Qiu, Sunnyvale, CA (US); Chun Han, Fremont, CA (US); Liang Peng, Sunnyvale, CA (US)

(73) Assignee: Oath, Inc., New York, NY (US)

( * ) Notice: Subject to any disclaimer, the term of this patent is extended or adjusted under 35 U.S.C. 154(b) by 106 days.

(21) Appl. No.: 15/656,411

(22) Filed: Jul. 21, 2017

(65) Prior Publication Data

US 2019/0028489 A1 Jan. 24, 2019

(51) Int. Cl.
| | |
|---|---|
| *G06F 11/00* | (2006.01) |
| *H04L 29/06* | (2006.01) |
| *G06Q 30/02* | (2012.01) |
| *G06F 12/14* | (2006.01) |

(52) U.S. Cl.
CPC ..... *H04L 63/1416* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 7,933,984 | B1* | 4/2011 | Smith | G06Q 10/0639 709/224 |
| 9,516,053 | B1* | 12/2016 | Muddu | G06F 16/254 |
| 10,037,546 | B1* | 7/2018 | Benisch | G06Q 30/0248 |
| 2011/0191853 | A1* | 8/2011 | Atcha | G06Q 30/0277 726/25 |
| 2011/0313844 | A1* | 12/2011 | Chandramouli | G06Q 30/0241 705/14.42 |
| 2017/0063886 | A1* | 3/2017 | Muddu | G06F 16/254 |

* cited by examiner

*Primary Examiner* — Gary S Gracia
(74) *Attorney, Agent, or Firm* — Pillsbury Winthrop Shaw Pittman LLP

(57) ABSTRACT

The present teaching generally relates to detecting abnormal user activity associated with an entity. In a non-limiting embodiment, baseline distribution data representing a baseline distribution characterizing normal user activities for an entity may be obtained. Information related to online user activities with respect to the entity may be received, distribution data representation a dynamic distribution may be determined based, at least in part, on the information. One or more measures characterizing a difference between the baseline distribution and the dynamic distribution may be computed, and in real-time it may be assessed whether the information indicates abnormal user activity. If the first information indicates abnormal user activity, then output data including the distribution data and the one or more measures may be generated.

20 Claims, 17 Drawing Sheets

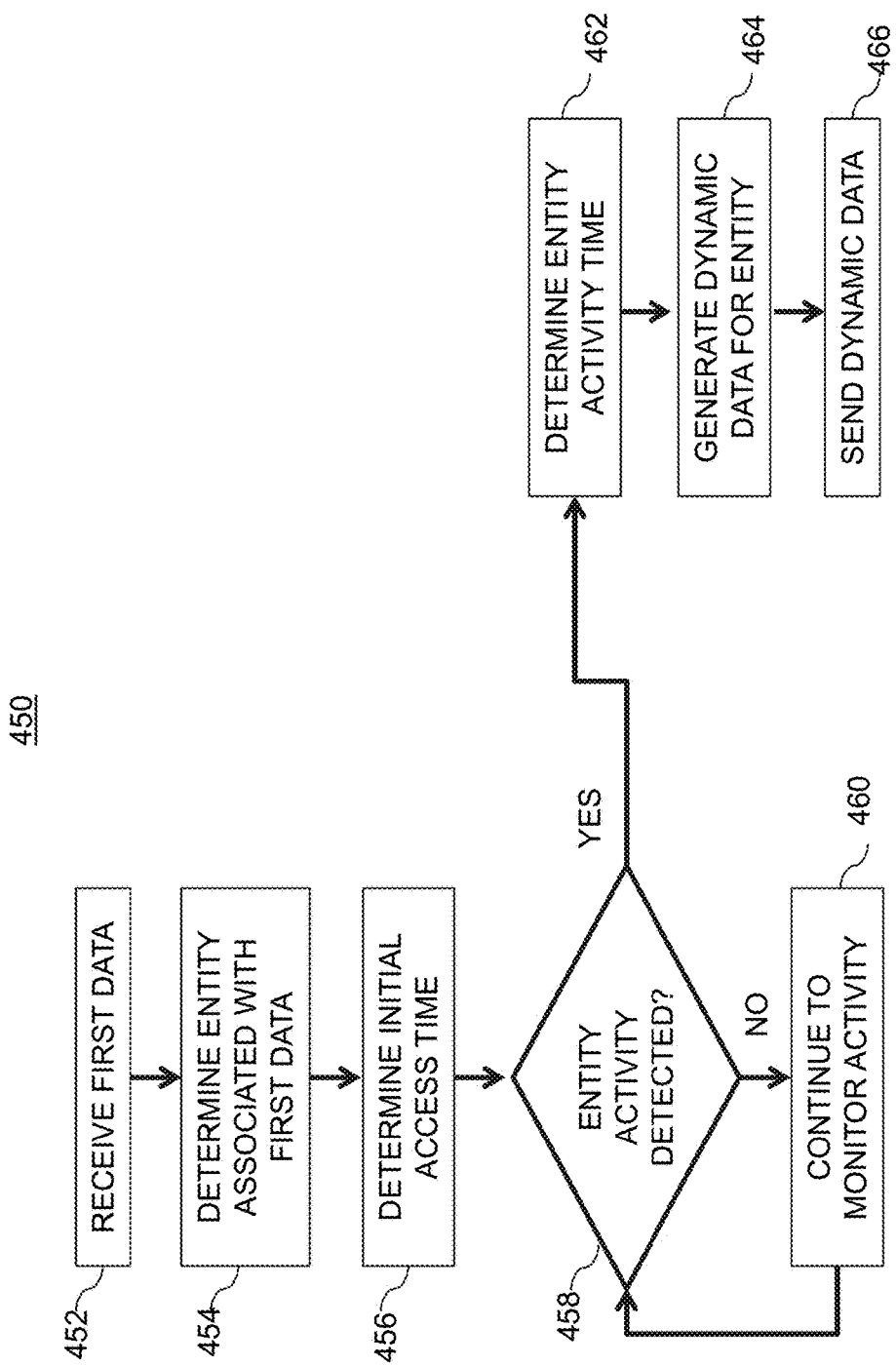

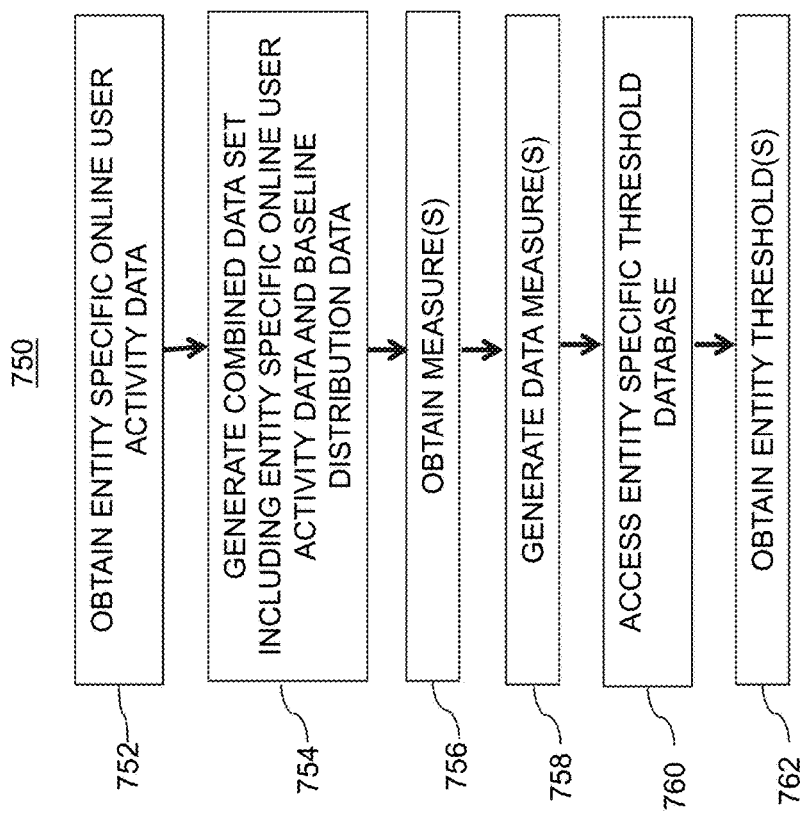

METHOD AND SYSTEM FOR DETECTING ABNORMAL ONLINE USER ACTIVITY

BACKGROUND

Technical Field

The present teaching generally relates to advertising. More specifically, the present teaching relates to detecting abnormal online user activity.

Technical Background

In the age of the Internet, advertising is a main source of revenue for many Internet companies. Traditionally, providers of goods/services and/or advertising agencies provide advertisements to be displayed on different platforms. Limited by the cost of producing the advertisement, and that of advertising, most advertisements are short but desire to deliver the right message to the audience. When an advertisement is provided with content (e.g., within a webpage), a user is able to click on that advertisement, which may direct the user to a particular website associated with the advertisement. Each "click" is also associated with a monetary exchange between the advertiser associated with the particular advertisement being provided, and a provider.

Online advertisement, in a basic format, includes a buyer and a seller—the buyer who to pay to have an advertisement displayed, and the seller who gets paid to display the buyer's advertisement. In slightly more complex systems, intermediary systems (e.g., ad networks) are also included, where the intermediary system monitors the activity of the publishers and advertisers. The intermediary system may also take publishers (e.g., sellers) and pair them with advertisers (e.g., buyers), typically pairing the advertiser willing to pay the most for a particular publisher's display space. The intermediary system receives a portion of the monetary exchange between the publisher and the buyer.

Ad exchangers function similarly to intermediary systems, however ad exchangers allow intermediary systems like ad networks to buy and/or sell advertisements. Therefore, one ad network is able to sell its publishers' ad space t another network and/or buy ad space for its advertisers—thereby allowing the corresponding advertiser's advertisement to reach a larger audience. The differences between ad networks and ad exchangers, however, is that ad networks in the exchange are not able to buy and sell one another's advertisements until a contractual agreement describing how traffic will be bought and sold between the two is established.

Such ad exchangers, while extremely useful to the various parties mention above, are susceptible to fraudulent activity, perpetuated commonly by cyber criminals. For instance, cyber criminals can develop programs to control compromised computers, or bots, and network them into a botnet, which can be instructed to view and click ads. This action simulates user traffic and, as a result, generates revenue for the cybercriminal as the cybercriminal can simply generate a webpage, sign up as a publisher, and direct their bots to view and click advertisements rendered by their own website.

Therefore, detection of fraudulent activities associated with user activity of a webpage is necessary to alleviate/minimize cyber-criminal activities.

SUMMARY

The teachings disclosed herein generally relate to methods, systems, and programming for detecting abnormal online user activities.

In one example, a method for detecting abnormal online user activities implemented on a computer including at least one processor, storage, and a communication platform is described. Baseline distribution data representing a baseline distribution characterizing normal user activities with respect to a first entity may be obtained by the at least one processor. First information related to online user activities with respect to the first entity may be received dynamically. First distribution data representing a dynamic distribution may be determined based, at least in part, on the first information. Using the baseline distribution data and the first distribution data, at least one measure characterizing a difference between the baseline distribution and the dynamic distribution may be computed. An assessment in real-time whether the first information indicates abnormal user activity may occur based, at least in part, on the at least one measure. In response to determining that the first information indicates that the first distribution data comprises a first indication of abnormal user activity behavior, first output data including at least the first distribution data and the at least one measure may be generated.

In another example, a system having at least one processor, storage, and a communication platform capable of connecting to a network for providing an advertisement is disclosed. The system comprises: an enhanced ad selection controller connecting to a network and configured for receiving via the network a request for an advertisement to be displayed to a user, a selector coupled with the enhanced ad selection controller and configured for obtaining an advertisement selected from a plurality of advertisements in accordance with the request, and a user curated native ad explorer, coupled with the enhanced ad selection controller and configured for receiving information about an event involving the user and with respect to the selected advertisement after being displayed to the user and initiating an action to explore user curated native advertisement based on the information about an event.

Other concepts relate to software for implementing the present teaching on exploring user curated native advertisements. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for data assignment in a distributed system is disclosed. The information, when read by the machine, causes the machine to perform the following: receiving, via a communication platform, a request for an advertisement to be displayed to a user, obtaining an advertisement selected from a plurality of advertisements based the request and/or information related to the user, receiving information about an event involving the user and with respect to the advertisement that has been displayed to the user, and initiating an action to explore at least one user curated native advertisement based on the received information about an event.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4B is an illustrative flowchart of an exemplary process for generating dynamic data using the exemplary online data collection system of FIG. 4A, in accordance with various embodiments of the present teaching;

FIG. 7B is an illustrative flowchart of an exemplary process for generating one or more measures and obtaining an entity threshold using the exemplary distribution measure system of FIG. 7A, in accordance with various embodiments of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed detecting abnormal online user activity. In a non-limiting embodiment, such abnormalities within user activity may be identified by detecting time-to-click ("TTC") abnormalities. TTC, as described herein, refers to an amount of time between when an advertisement, or ad, is rendered on a webpage that a user may view, and when a user clicks on that ad, if the user does in fact click on the ad. Abnormal TTC data likely indicates some sort of abnormality within the system, such as, and without limitation, an outage of the ad system, an integration issue, or possible fraudulent activities.

As an illustrative example, TTC data representing online user activity associated with an entity is drawn against baseline TTC data representing expected user activity, or normal user activity, for that entity. Depending on one or more qualitative aspects of the TTC data, a determination is made as to whether or not the TTC data represents abnormal user activity or normal user activity. Historically, this process was performed manually, as it depends on an expert to attribute certain TTC data as representing abnormal user activity. However, this process is previously has not been scalable to the large scale entities and users associated with the advertisement/advertiser/ad exchanger buyer-seller relationship. Technical solutions for providing such scalability to detect abnormal user activity are described in greater detail herein.

Figure 1:
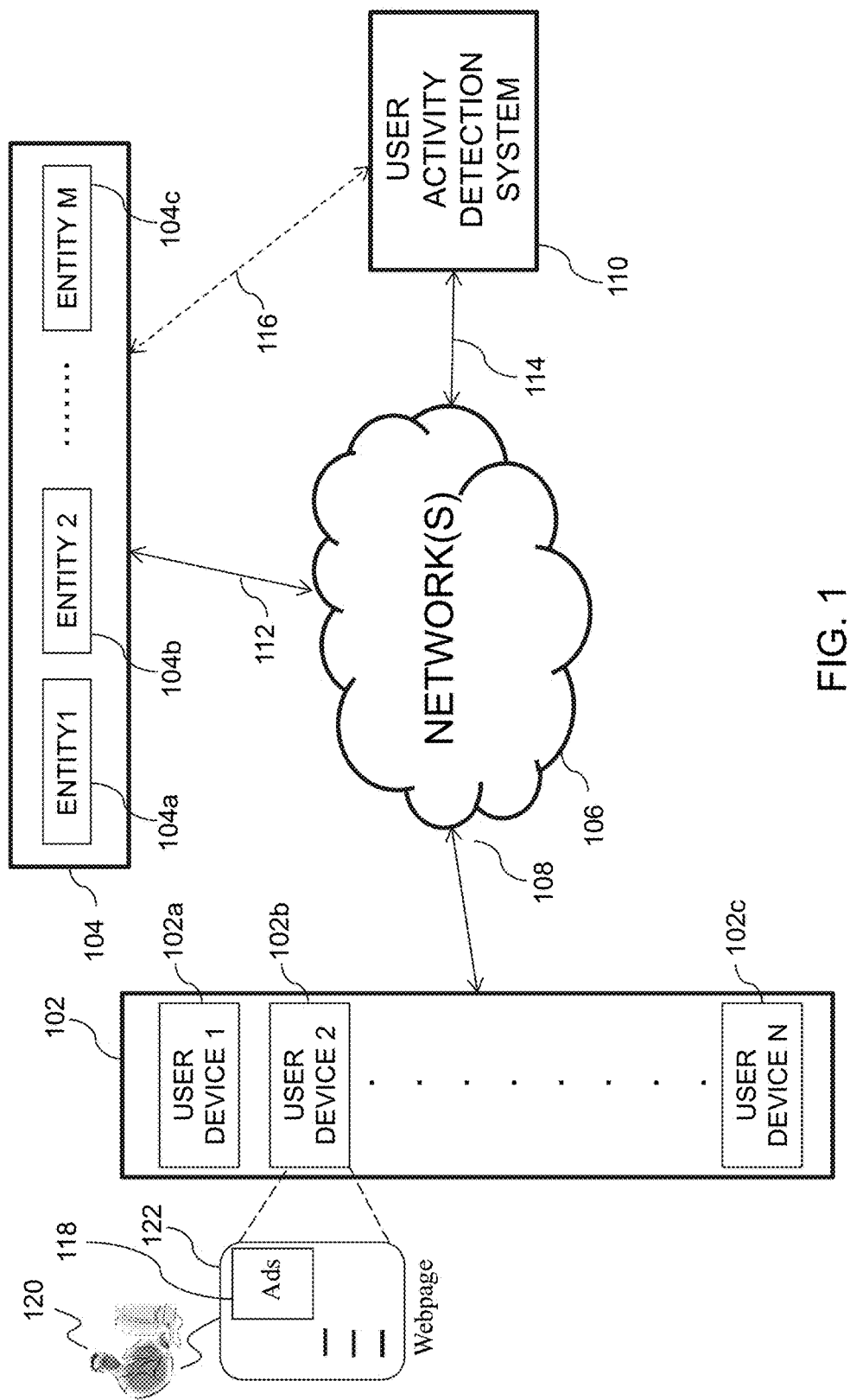
FIG. 1 is an illustrative diagram of an exemplary system for detecting abnormal user activity associated with an entity, in accordance with various embodiments of the present teaching.

FIG. 1 is an illustrative diagram of an exemplary system for detecting abnormal user activity associated with an entity, in accordance with various embodiments of the present teaching. In the non-limiting example embodiment, an exemplary system 100 is described. System 100 includes, in one embodiment, one or more user devices 102a, 102b, 102c, which collectively may be referred to as user device(s) 102. For example, user device(s) 102 may correspond to any suitable type of electronic device including, but are not limited to, desktop computers, mobile computers (e.g., laptops, ultrabooks), mobile phones, smart phones, tablets, televisions, set top boxes, smart televisions, personal display devices, personal digital assistants ("PDAs"), gaming consoles and/or devices, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.).

In one embodiment, user device 102 may include a display screen 122, which is described in greater detail below with reference to FIG. 12, which may be capable of presenting content. For example, display screen 122 may display a webpage including one or more advertisements 118. The particular type of advertisement may be related to one or more of the content associated with the webpage, a user 120 viewing the content, a user profile associated with user 120, user interactions with user device 102 and/or any other devices and/or systems, a type of device that user device 102 corresponds to, and the like. Persons of ordinary skill in the art will recognize that a type of advertisement 118 and/or an amount of advertisements 118 displayed may be based on any suitable criteria, and the aforementioned is merely exemplary.

User 120 may cause, using user device 102, a request or a search query for online content to be sent to entities 104, and/or may receive content via the network(s) 106. The online content and ads may be provided and rendered on the user device. User 120 via user device 102 may interact with the rendered content and/or ads (e.g., clicking, dwelling, hovering on/over, tapping, swiping, scrolling, flicking, etc., the content and/or ads). Some user interactions may reflect the user's reaction to the content/ads displayed. For example, the user may click on as 118, which may ultimately lead to a click through or conversion (e.g., a purchase made for a product/service advertised by ad 118). As another example, a dwell time may correspond to an amount of time that the user spent on ad 118 (e.g., detected by computing an amount of time during which the cursor, finger, or other input mechanism, dwells on ad 118) may indicate that the user is interested in the ad's content (e.g., a product/service being advertised). In the context of the present teaching, such user interaction related to the ads on display may be observed and used to explore user curated native ad sources and subsequently provide diversified sources of ads to enhance the effectiveness of advertisement and user experience.

System 100 may further include one or more entities, such as entity 104a, 104b, and 104c, which may collectively be referred to as entity/entities 104. The number of user devices (e.g., user devices 1-user devices N) and the number of entities (e.g., entity 1-entity M) may be the same or may differ, the present teaching is not limited in either case. Each entity corresponds to a provider of content for one or more of user devices 102. For example, considering the model previously described, entities 104 may correspond to an advertiser, an ad exchange, and intermediary system, and the like. Each entity 104 is configured to generate and send content to one or more of user devices 102 via one or more networks 106. The content (e.g., a webpage) may include information consumable by user 120, for instance, as well as one or more advertisements 118. In the illustrative embodiment, entities 104 may establish a communications link 112 with network(s) 106, which in turn provides the content to user devices 102 via a communications link 108. Furthermore, user devices 102 may communicate with entities 104, a user activity detection system 110, and/or any other suitable device/system, via communications links 108 (as well as 112).

Entities 104, in one embodiment, may correspond to a device/system operated by an individual, a firm, or an organization, which publishes or supplies content. For example, a blogger, television station, a newspaper issuer, a web page host, a content portal, an online service provider, and/or a game server may each correspond to an entity. In one embodiment, content sent to user devices 102 may be generated or formatted by entities 104 based on data provided by or retrieved from one or more content sources. A content source, as described herein, may correspond to an entity where the content was originally generated and/or stored. For example, an article may be originally printed in a magazine but then posted online at a web site controlled by a publisher.

User activity detection system 110, which is described in greater detail below, may be, in one embodiment, configured to analyze user activity with content provided by one or more of entities 104 to determine whether or not that user activity is abnormal. If the activity is deemed abnormal, this may indicate that a fraudulent, or other systematic error, is occurring, and therefore additional processing and analysis of the user activity may be required.

In one embodiment, user activity detection system 110 is configured to monitor user activity associated with one or more of entities 104 via network(s) 106 by establishing a communications link 114 with network(s) 106. However, alternatively, user activity detection system 110 may, in one embodiment, monitor user activity associated with one or more entities 104 by communicating with entities 104 using a communications link 116. For instance, when user activity detection system 110 communicates with network(s) 106 via communication link 114, user activity detection system 110 may serve as an independent service in relation to entities 104. Alternatively, when user activity detection system 110 communicates with entities 104 via communications link 116, user activity detection system 110 may function as a backend sub-system for entities 104.

Network(s) 106 may be a single network or a combination of different networks. For example, a network may be a local area network ("LAN"), a wide area network ("WAN"), a public network, a private network, a proprietary network, a Public Telephone Switched Network (PSTN), the Internet, a wireless network, a cellular network, a virtual network, or any combination thereof. A network may also include various network access points, (e.g., wired or wireless access points such as base stations or Internet exchange points) through which a data source may connect to the network(s) 106 in order to transmit information via network(s) 106, and a network node may connect to the network(s) 106 in order to receive information. In one embodiment, the network(s) 106 may correspond to an online advertising network or an ad network, which connects user activity detection system 110 to entities 104 or websites/mobile applications that desire to host or receive advertisements. An ad network may, for example, be a television ad network, a print ad network, an online (Internet) ad network, and/or a mobile ad network.

For a given online session in which a user 120 accesses online content provided by one of entities 104 via one of user devices 102, the online content may be presented and rendered on user device 102 with one or more advertisements. The number of advertisements may depend on a number/quantity of ad-space capable of being present with the online content. For each ad-space, entity 104 requests an advertisement from an ad server, and the ad selected is to be rendered in the intended online content's (e.g., webpage) ad-space. After obtaining the selected ads for each ad-space associated with the particular online content, entity 104 sends the online content including the corresponding selected ads to user device 102 so that the online content including the selected ads may be rendered via display 122.

In requesting an advertisement to be displayed to user device 102 with the online content (e.g., a webpage), entities 104 may provide contextual information related to the online content and/or the particular user (e.g., user 120) associated with the target user device 102. User activity events, such as, and without limitation, user interactions associated with an advertisement displayed with the online content, may also be monitored by user activity detection system 110 to identify potential abnormal user activity.

Entities 104 may be configured to provide product(s) and/or service(s), and may be configured to handle the advertising process for its own product(s) and/or a service (e.g., websites, mobile applications, etc.) related to advertising, or a combination thereof. For example, entity 104 may include such systems as an advertising agency or a dealer of advertisement that operates a platform that connects an advertiser or advertising agency one or more additional entities.

Advertisements may be obtained from a plurality of sources, which may be stored within an advertisement database. Furthermore, different ads may be of different types, and online content may include one or more advertisements of two or more advertisement types. The various advertisement types may include, but are not limited to, streaming content, static content, sponsored content, and/or any combination thereof. For example, static content may include text, image, audio, or any rich media combination thereof. Each advertisement may be placed at any location of the online content (e.g., a content page, mobile app), and may be presented both as part of a content stream as well as a standalone advertisement, rendered strategically around or within the content stream. The various types of content sources may include, but are not limited to, online news, published papers, blogs, on-line tabloids, magazines, audio content, image content, and video content. The content sources may alternatively, or additionally, correspond to a content portal presenting content originated from a content provider. The content obtained from such content sources may include, but is not limited to, multi-media content, text, or any other form of content comprised of website content, social media content, or any other content originator. The content further may be licensed content and/or content crawled and indexed from various sources on the Internet. Each ad may be stored with some textual information related to that ad, including a description of what that ad is about as well as additional information such as intended audience of the ad, which may be identified via such parameters as demographics of the intended audience, geographical locations where the ad is to be displayed, and/or time frame(s) when the ad is to be presented to the intended audience.

Figure 2:
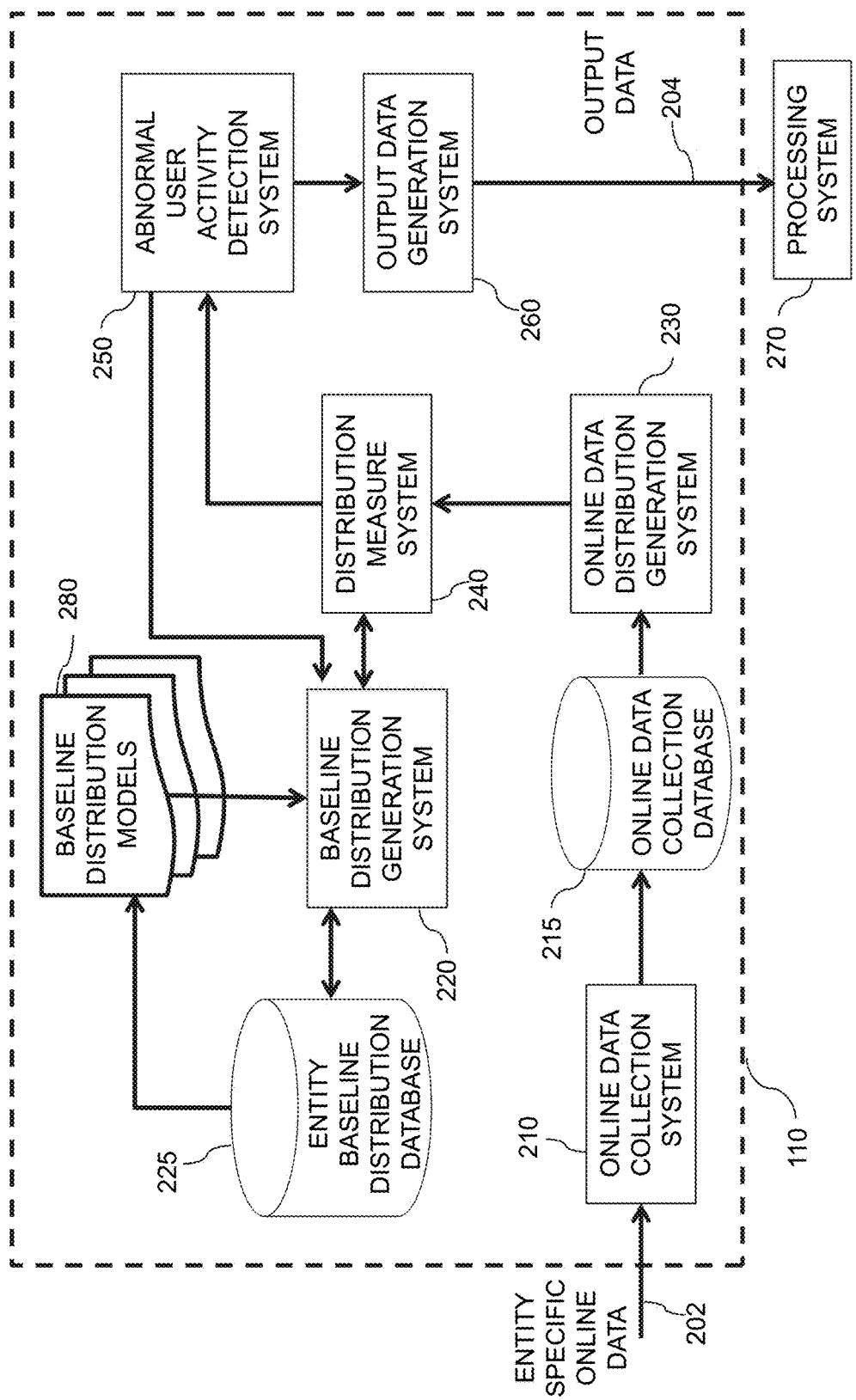
FIG. 2 is an illustrative diagram of an exemplary user activity detection system, in accordance with various embodiments of the present teaching.

FIG. 2 is an illustrative diagram of an exemplary user activity detection system, in accordance with various embodiments of the present teaching. In the non-limiting embodiment, user activity detection system 110 includes an online data collection system 210, a baseline distribution generation system 220, an online data distribution system 230, a distribution measure system 240, an abnormal user activity detection system 250, and an output data generation system 260. User activity detection system 110 may further include an online data collection database 215 and an entity baseline distribution database 225. Additionally, in some embodiments, user activity detection system 110 may further include, or be in communication with, a processing system 270.

Processing system 270 may be configured to process the output data and perform one or more functions based on whether or not the entity specific online data represents abnormal user activity or normal user activity. For example, processing system 270 may, if the output data indicates the presence of abnormal user activity, identify the entity that the abnormal user activity relates to, and may determine whether the abnormal user activity represents fraudulent user behavior (e.g., one or more bots or fake user clicks), an outage somewhere within system 100, and/or any other type of issue which may cause the presence of abnormal user activity. Persons of ordinary skill in the art will recognize that in some embodiments processing system 270 may be external to user activity detection system 110, however this is merely exemplary.

When entity specific online data 202 is received by user activity detection system 110 from entities 104, entity specific online data 202 is provided to online data collection system 210, which may store the online data using online data collection database 215. Online data distribution generation system 230 may pull the online data from online data collection database 215, and may generate distribution data representing the online data and provide the distribution data to distribution measure system 240. Distribution measure system 240 may be configured, in one embodiment, to determine one or more measures associated with the online data using the distribution data and baseline distribution data representing a baseline distribution for an entity associated with entity specific online data 202. Baseline distribution generation system 220 may be configured to generate baseline distribution data representing an entity's baseline distribution using baseline distribution data stored by entity baseline distribution database 225 and baseline distribution models 280. Baseline distribution models 280 may include information that baseline distribution generation system 220 may use to generate baseline distribution data for a particular entity. After determining the one or more measures, distribution measure system 240 may provide the distribution data to abnormal user activity detection system 250. If, for instance, system 250 determines that online data 202 indicates abnormal user activity, then abnormal user activity detection system 250 may provide this information to output data generation system 260, which may generate output data 204 reflective of the abnormal user activity and the specific entity with which it relates to. However, if system 250 determines that online data indicates normal user activity, system 250, in one embodiment, may provide inform baseline distribution generation system 220 so that the online data may be stored and used as an update to that entity's baseline distribution.

Figure 3:
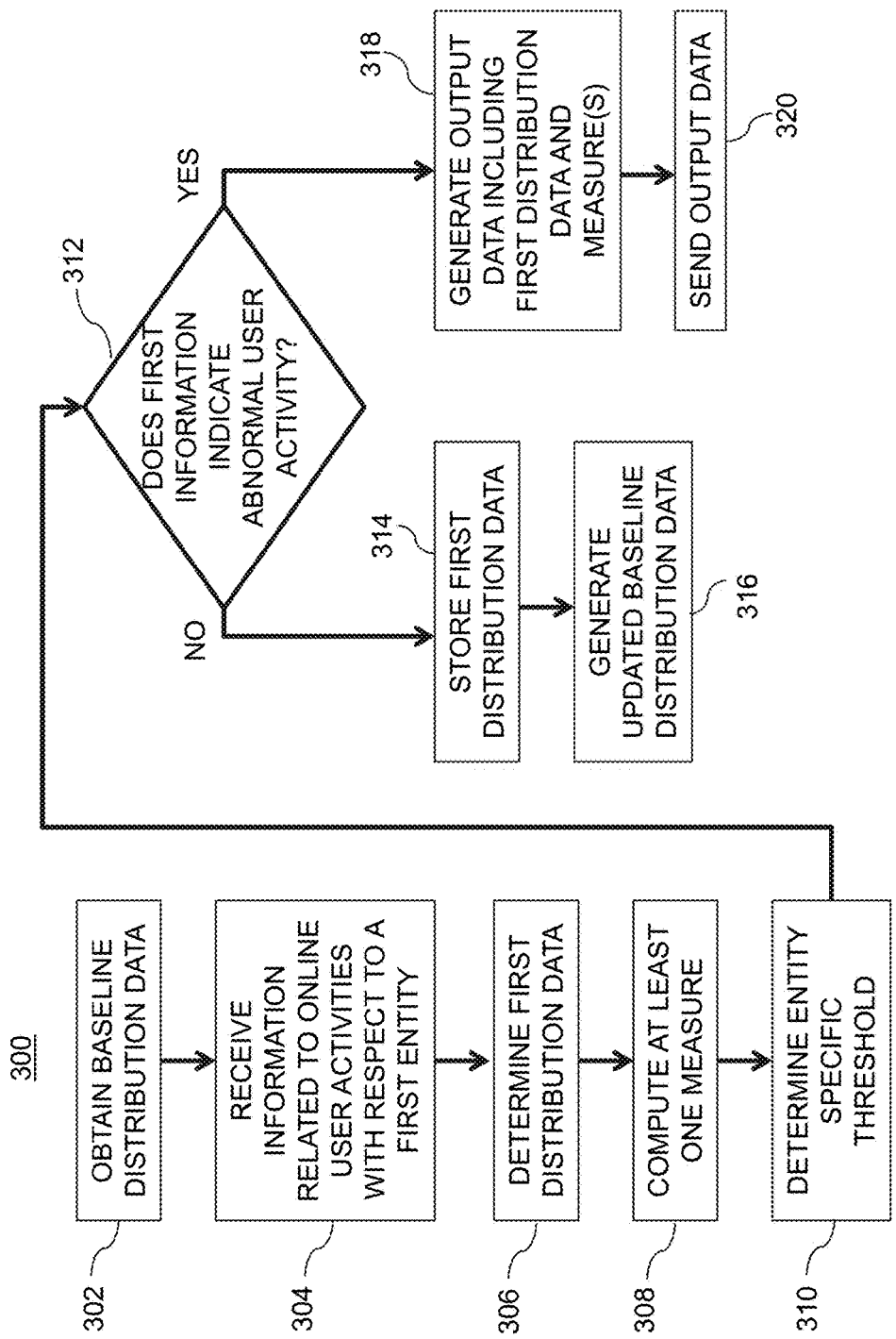
FIG. 3 is an illustrative flowchart of an exemplary process for detecting whether an entity detected abnormal user activity, in accordance with various embodiments of the present teaching.

FIG. 3 is an illustrative flowchart of an exemplary process for detecting whether an entity detected abnormal user activity, in accordance with various embodiments of the present teaching. Process 300, in one non-limiting embodiment, may begin at step 302. At step 302, baseline distribution data may be obtained. For instance, baseline distribution data may be obtained from baseline distribution generation system 220. In some embodiments, upon receipt of a request to generate a baseline distribution for a specific entity, baseline distribution generation system 220 may access entity baseline distribution database 225 to obtain entity specific baseline distribution data. The request may, for instance, include entity identifiers indicating a particular entity with which the baseline distribution data is to be retrieved. Baseline distribution generation system 220 may, upon receipt of the baseline distribution data for the specific entity, obtain one or more baseline distribution models 280 that may be used to model the baseline distribution data. For example, baseline distribution models 280 may include various data models that can be used to model data such as, and without limitations, Gaussian distributions, Poisson distributions, higher order distributions, and/or customized distributions. After the appropriate baseline distribution model(s) 280 is/are received as well as the entity specific baseline data, baseline distribution generation system 220 may be configured to generate entity specific baseline distribution data representing a baseline distribution for a particular entity. In one non-limiting embodiment, a particular entity's baseline distribution data may be already generated and stored by entity baseline distribution database 225. Therefore, upon receiving the request for the baseline distribution data, baseline distribution generation system 220 may receive that entity's baseline distribution data.

At step 304, information related to online user activities with respect to a first entity may be received. The information, in one embodiment, may indicate TTC data associated with a particular entity. For instance, when a user accesses a website associated with an entity (e.g., a finance entity's webpage, a sports entity's webpage, a news entity's webpage, etc.), the entity may record a timestamp indicating a time that the user input the website's URL into their browser, a time that content was sent to the user's device, and/or any other suitable time associated with a user's first access to the website. The information, in one embodiment, may be dynamically received. For instance, users interact with a webpage, input data representing those interactions, or lack of interactions if none have occurred, may continually be received. In some embodiments, the entity's website may include one or more pieces of additional content such as, and without limitation, advertisements, media streams (e.g., commercials), and/or hyperlinks. If the user attempts to access the content associated with one or more of these pieces of additional content, the entity may record a timestamp indicating a time that the access was first made. For example, if a user enters in a URL on their user device 102 for a webpage hosted by an entity 104, a time that the URL was loaded onto the user device may be stored by entity 104 (and/or user device 102). If a user 120 clicks, presses, taps, or otherwise invokes, an advertisement displayed on the webpage, then a time associated with that action (e.g., click, press, tap, etc.) may also be recorded. A temporal difference between the time of rendering of the webpage and a time of action associated with the additional content (e.g., advertisement) may correspond to time-to-click data associated with that one event. Thus, when the information is received at step 304, TTC information (e.g., TTC data representing TTC amounts of time) for various user activities associated with the first entity may be received by user activity detection system 110.

At step 306, first distribution data may be determined. For instance, upon receipt of the information related to the online user activities, online data distribution generation system 230 may determine and/or generate first distribution data representing a first distribution of TTC for the first entity. The first distribution may, in one embodiment, indicate a percentage of users that provided an action (e.g., clicked on an advertisement displayed within a webpage) in relation to an amount of time that it took for them to provide the action from receiving the webpage's content. For example, a first advertisement displayed within a webpage may be accessed by 5% of the users within approximately 1 second of the advertisement and/or webpage being rendered, whereas 20% of the users may access the first advertisement within approximately 2 seconds of the advertisement and/or webpage being rendered. Persons of ordinary skill in the art will recognize that the percentage of users may correspond to a total number of users that provided the action (e.g., click on the advertisement) or a total number of users that access the webpage rendering the actionable content (e.g., the advertisement) and the aforementioned is merely exemplary.

At step 308, at least one measure may be computed. In some embodiments, distribution measure system 240 may be configured to compute the at least one measure in real-time. For instance, the one or more measures may be computed substantially immediately, with minimally latency (e.g., less than a second). As an example, distribution measure system 240 may be configured to compute a Kolmogorov-Smirnov ("KS") value and/or an Information Value ("IV") associated with the first entity TTC data upon receipt of the TTC data. In a non-limiting embodiment, distribution measure system 240 may use the baseline distribution data associated with the first entity and the first distribution data associated with the first entity to compute the one or more measures. At step 310, an entity specific threshold may be determined. In one embodiment, distribution measure system 240 may obtain a threshold associated with the particular entity with which the one or more measures is/are being computed for from an entity specific threshold database (e.g., entity specific threshold database 725 of FIG. 7A).

At step 312, a determination may be made as to whether or not the first information indicates abnormal user activity. For instance, abnormal user activity detection system 250 may determine, based on the one or more measures that have been computed, whether entity specific online data 202 represents abnormal user activity or normal user activity. As an illustrative example, abnormal user activity may indicate that fraudulent acts (e.g., bots or other malware) is automatically clicking on an advertisement or other content to boost that contents numbers and/or generate revenue for a cybercriminal. If, at step 312, abnormal user activity detection system 250 determines that the first information does not indicate abnormal user activity, then process 300 may proceed to step 314.

At step 314, the first distribution data may be stored within entity baseline distribution database 225. For instance, because entity specific online data 202 does not represent abnormal user activity, this indicates that the user activity represented by entity specific online data 202 may be classified as being normal user activity. Therefore, entity specific online data 202 may be provided to baseline distribution generation system 220 and entity baseline distribution database 225 to further refine and update the first entity's baseline distribution. At step 316, updated baseline distribution data may be generated. For example, baseline distribution generation system 220 may generate an updated baseline distribution for the first entity based on the previously stored baseline distribution data associated with the first entity and the entity specific online data 202.

If, however, at step 312, abnormal user activity detection system 250 determines that the first information does indicate abnormal user activity, then process 300 may proceed to step 318. At step 318, output data including the first distribution data representing the entity specific online data's distribution, and the one or more measures, may be generated. For instance, output data generation system 260 may generate the output data. At step 320, the output data may be sent to one or more processing systems 270 for additional analysis and or actions to be taken. For example, if abnormal user activity is detected, output data 204 may be sent to a fraudulent user activity monitoring system to cause subsequent user activity to be suppressed and/or cancelled such that no more potentially fraudulent user activity occurs.

Figure 4A:
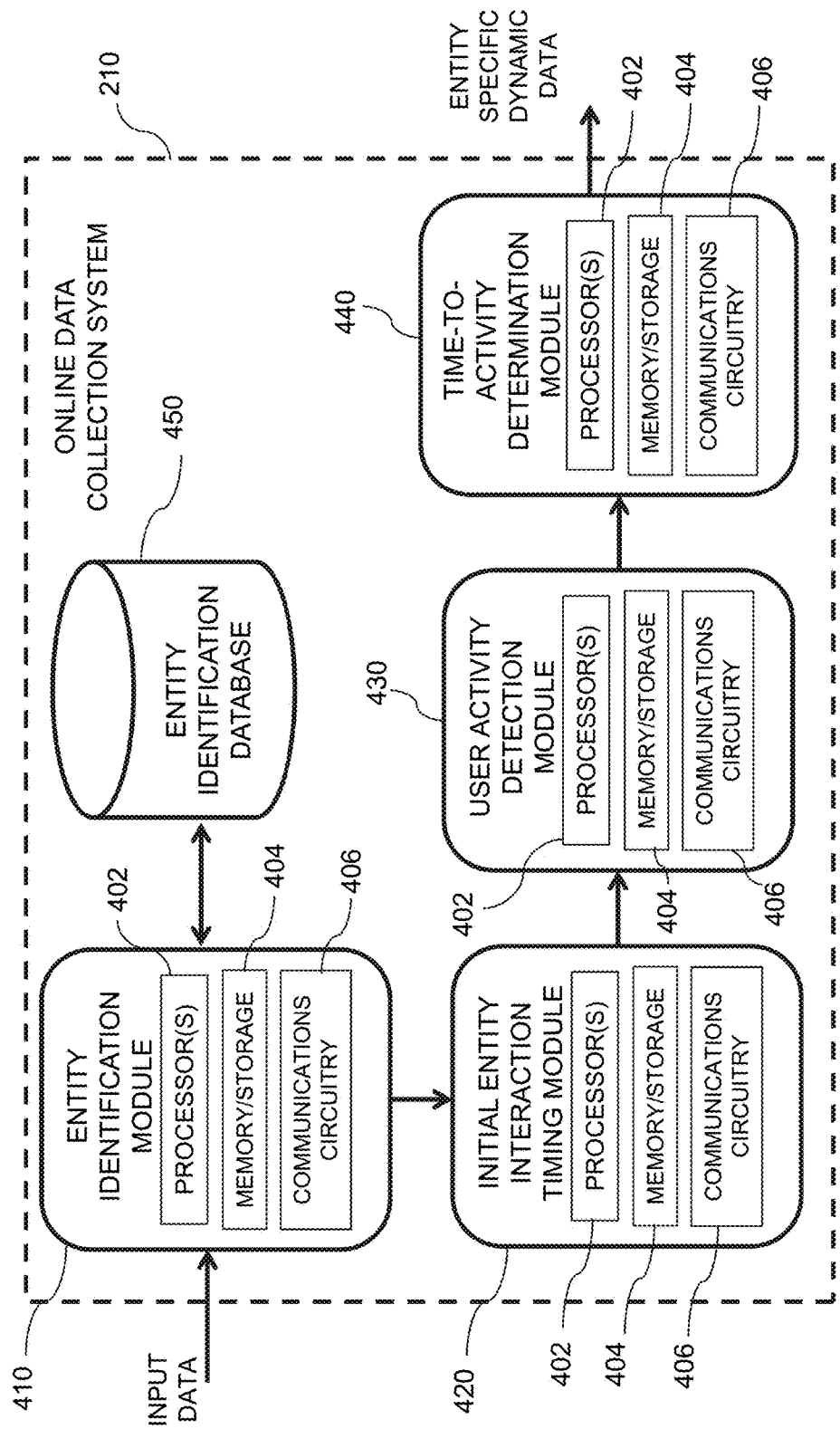
FIG. 4A is an illustrative diagram of an exemplary online data collection system included by the user activity detection system of FIG. 2, in accordance with various embodiments of the present teaching.

FIG. 4A is an illustrative diagram of an exemplary online data collection system included by the user activity detection system of FIG. 2, in accordance with various embodiments of the present teaching. Online data collection system 210, in the illustrative non-limiting embodiment, may include an entity identification module 410, an initial entity interaction timing module 420, a user activity detection module 430, and a time-to-activity determination module 440. Each of entity identification module 410, initial entity interaction timing module 420, user activity detection module 430, and time-to-activity determination module 440 may include one or more processor(s) 402, memory/storage 404, and communications circuitry 406, amongst other components.

Processor(s) 402 may include any suitable processing circuitry capable of controlling operations and functionality of one or more components/modules of online data collection system 210, as well as facilitating communications between various components within online data collection system 210 and/or with one or more other systems/components of user activity detection system 110. In some embodiments, processor(s) 402 may include a central processing unit ("CPU"), a graphic processing unit ("GPU"), one or more microprocessors, a digital signal processor, or any other type of processor, or any combination thereof. In some embodiments, the functionality of processor(s) 402 may be performed by one or more hardware logic components including, but not limited to, field-programmable gate arrays ("FPGA"), application specific integrated circuits ("ASICs"), application-specific standard products ("AS-SPs"), system-on-chip systems ("SOCs"), and/or complex programmable logic devices ("CPLDs"). Furthermore, each of processor(s) 402 may include its own local memory, which may store program systems, program data, and/or one or more operating systems. However, processor(s) 402 may run an operating system ("OS") for one or more components of online data collection system 210 (e.g., entity identification module 410, initial entity interaction timing module 420, user activity detection module 430, and/or time-to-activity determination module 440), and/or one or more firmware applications, media applications, and/or applications resident thereon. In some embodiments, processor(s) 402 may run a local client script for reading and rendering content received from one or more websites. For example, processor(s) 402 may run a local JavaScript client for rendering HTML or XHTML content received from a particular URL accessed by electronic device(s) 10 and/or 100.

Storage/memory 404 may include one or more types of storage mediums such as any volatile or non-volatile memory, or any removable or non-removable memory implemented in any suitable manner to store data for one or more of entity identification module 410, initial entity interaction timing module 420, user activity detection module 430, and/or time-to-activity determination module 440. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 404 may be implemented as computer-readable storage media ("CRSM"), which may be any available physical media accessible by processor(s) 402 to execute one or more instructions stored within storage/memory 404. In some embodiments, one or more applications (e.g., gaming, music, video, calendars, lists, etc.) may be run by processor(s) 402, and may be stored in memory 404.

Communications circuitry 406 may include any circuitry allowing or enabling one or more components of online data collection system 210 to communicate with one another, and/or with one or more additional devices, servers, and/or systems. For example, communications circuitry 406 may facilitate communications between two or more of entity identification module 410, initial entity interaction timing module 420, user activity detection module 430, time-to-activity determination module 440, and/or entity identification database 450, or between one or more components of user activity detection system 110. In some embodiments, communications between one or more components of user activity detection system 110 may be communicate with user devices 102 and/or entities 104 across network(s) 106 via communications circuitry 406. For example, network(s) 106 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of user activity detection system 110 and/or to/from user activity detection system 110, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications circuitry 406 may use any communications protocol, such as any of the previously mentioned exemplary communications protocols. In some embodiments, one or more components of user activity detection system 110 (e.g., online data collection system 210) may include one or more antennas to facilitate wireless communications with a network using various wireless technologies (e.g., Wi-Fi, Bluetooth, radiofrequency, etc.). In yet another embodiment, one or more components of user activity detection system may include one or more universal serial bus ("USB") ports, one or more Ethernet or broadband ports, and/or any other type of hardwire access port so that communications circuitry 406 facilitates communications with one or more communications networks.

In a non-limiting embodiment, input data may be received by online data collection system 210 at entity identification module 410. Upon a user accessing a webpage associated with an entity, input data indicating that access has occurred may be received. The input data may include, amongst other features, an entity identifier, such as metadata indicating the entity associated with the accessed webpage. Entity identification module 410 may be configured, for instance, to receive the input data and extract, or otherwise determine, the entity identifier associated therewith. In response to identifying the entity identifier, entity identification module 410 may access entity identification database 450 to determine which entity from entities 104 that the input data is associated with. Entity identification database 450 may include list data that indicates entity information (e.g., entity names, addresses, genres, and the like), and a corresponding entity identifier associated therewith. Therefore, upon accessing entity identification database 450, entity identification module 410 may be configured to obtain entity information associated with the identified entity identifier from the input data. Persons of ordinary skill in the art will recognize that, in some embodiments, entity identification module 410 may store the entity information locally within memory/storage 404 as opposed to accessing entity identification database 450, and the aforementioned is merely illustrative.

Initial entity interaction timing module 420 may be configured to determine an initial time that a webpage associated with the entity has been accessed. For example, upon receipt of the input data, initial entity interaction timing module 420 may determine a timestamp associated with a corresponding user device 102 accessing a webpage of an entity 104. The input data may, in one embodiment, include temporal metadata including the initial access timestamp. In some embodiments, the input data may be processed in parallel by entity identification module 410 and initial entity interaction timing module 420, however this is merely exemplary.

After identifying the initial access timestamp for a particular user, user activity detection module 430 may monitor that user's activity with the entity's webpage. For example, user activity detection module 430 may monitor when a user clicks on an advertisement displayed by a webpage associated with a particular entity, scrolled or clicked on content associated with the webpage, cease interacting with the webpage (e.g., no activity detected for an amount of time exceeding a threshold temporal amount), and/or any other user activity, or any combination thereof. In one embodiment, upon determining that a user activity event has occurred (e.g., a user selecting an advertisement displayed by an entity's webpage), user activity detection module 430 may be configured to determine a timestamp associated with the activity. For instance, data indicating a user activity event has occurred may be received by online data collection system 210, and user activity detection module 430 may determine a timestamp associated with that event based on the data received.

Time-to-Activity ("TTA") determination module 440, which may also be referred to as a time-to-click ("TTC") module, and the two may be referred to interchangeably herein, may be configured to determine an amount of time from when a user first accessed a webpage associated with an entity to when the user performed the user activity. As an illustrative example, TTA determination module 440 may determine an amount of time that transpired between when a first user device 102 first accessed a webpage associated with an entity 104 to when the first user device 102 clicked, tapped, or otherwise selected, an advertisement being displayed on the webpage. The amount of time, which may be referred to as the TTC (e.g., time-to-click), may be determined based on the initial access timestamp determined by initial entity interaction timing module 420 and the user activity event determined by user activity detection module 430. As a result, online data collection system 210 may be configured to generate entity specific dynamic data that indicates a particular entity with which user activity was detected, and an amount of time from when one or more users first accessed a webpage associated with the entity to when the one or more users performed a particular type, or types, of user activity events (e.g., clicked on an advertisement).

FIG. 4B is an illustrative flowchart of an exemplary process for generating dynamic data using the exemplary online data collection system of FIG. 4A, in accordance with various embodiments of the present teaching. Process 450, in one embodiment, may begin at step 452. At step 452, first data may be received. For example, online data collection system 210 may receive input data from a webpage associated with an entity. In one embodiment, entity identification module 410 and/or initial entity interaction timing module 420 may receive the first data. At step 454, an entity associated with the first data may be determined. For instance, upon receipt of the first data, entity identification module 410 may determine, using entity identification database 450, an entity that the first data was received from.

At step 456, an initial access time may be determined. For instance, initial entity interaction timing module 420 may determine a timestamp indicating an approximate first time that a user device (or multiple user devices) accessed the webpage associated with the entity. At step 458, a determination may be made as to whether or not entity activity has been detected. In one embodiment, user activity detection module 430 may monitor interactions with the webpage to determine whether a user activity event has occurred on, or with, the webpage. For example, user activity detection module 430 may determine whether a user device had selected an advertisement displayed on the webpage.

If, at step 458, user activity detection module 430 determines that no activity has been detected, process 450 may proceed to step 460 to continue monitoring for user activity events. In some embodiments, a timeout feature may be included that causes process 450 to end if no activity has been detected in excess of a predefined amount of time. However, if at step 458 an activity event is detected, then process 450 may proceed to step 462. At step 462, an entity activity time associated with the user activity event associated with the entity may be determined. For example, a timestamp indicating a time that a user device detected a selection (e.g., a mouse click, tap, or other input) of an advertisement displayed by the webpage.

At step 464, dynamic data for the entity may be generated. For instance, TTA determination module 440 may determine an amount of time between the initial access time and the entity activity time. TTA determination module 440 may then generate dynamic data that indicates the amount of time, or TTC, and the particular entity that the amount of time is associated with. At step 466, online data collection system 210 may send the dynamic data to one or more components of user activity detection system 110. For example, the dynamic data may be sent to online data collection database 215 to be stored as being associated with that particular entity.

Figure 5A:
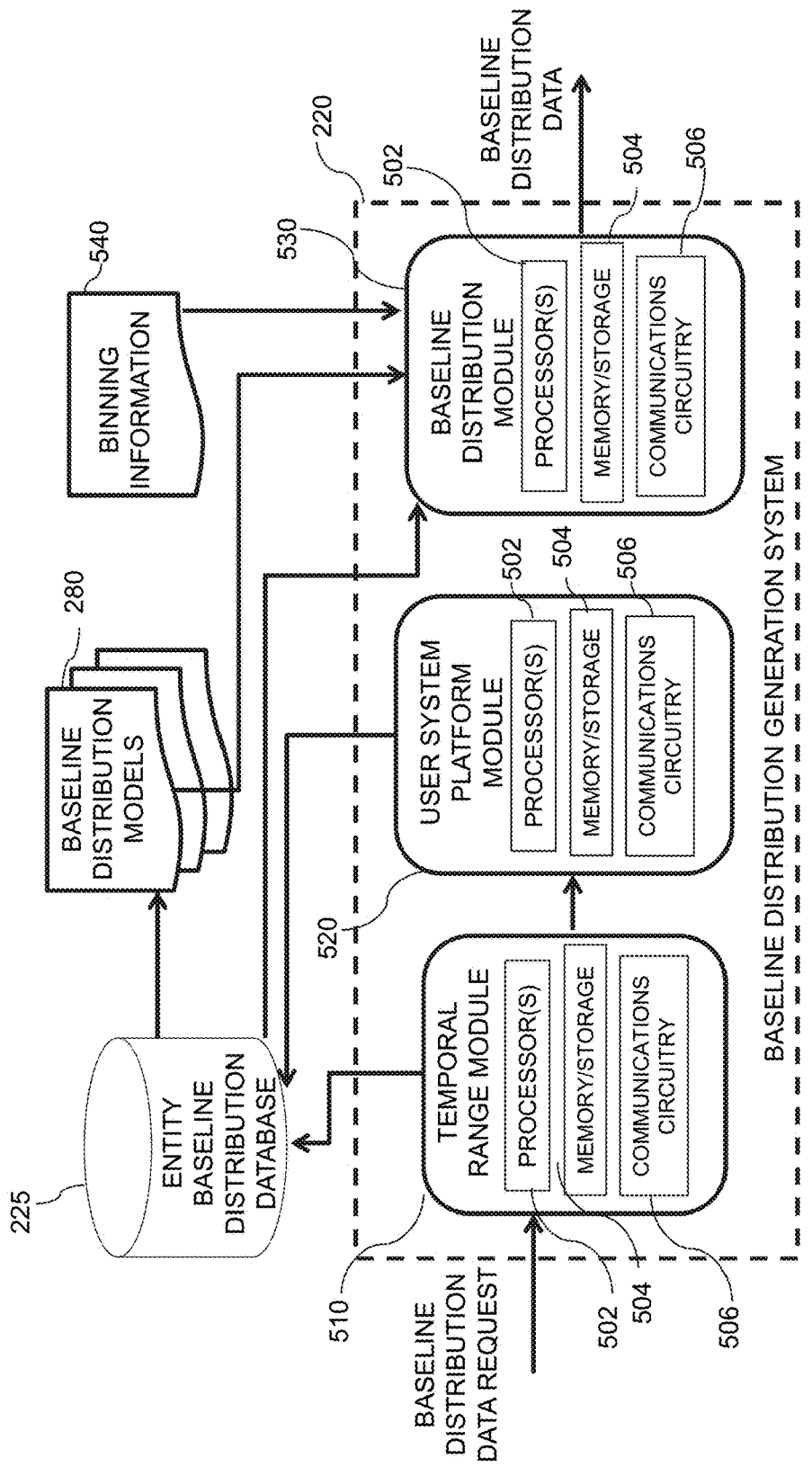
FIG. 5A is an illustrative diagram of an exemplary baseline distribution generation system included by the user activity detection system of FIG. 2, in accordance with various embodiments of the present teaching.

FIG. 5A is an illustrative diagram of an exemplary baseline distribution generation system included by the user activity detection system of FIG. 2, in accordance with various embodiments of the present teaching. In the illustrative non-limiting embodiment, baseline distribution generation system 220 may include a temporal range module 510, a user system platform module 520, and a baseline distribution module 530. Each of temporal range module 510, user system platform module 520, and baseline distribution module 530 may include one or more processors 502, memory/storage 504, and communications circuitry 506, amongst other components. In some embodiments, processor(s) 502, memory/storage 504, and communications circuitry 506 may be substantially similar to processor(s) 402, memory/storage 404, and communications circuitry 406, and the previous description may apply.

In one embodiment, a baseline distribution data request may be received by baseline distribution generation system 220. For example, the request may be received by temporal range module 520. In some embodiments, the request may be received from distribution measure system 240 in response to dynamic data being received by online data collection system 210. In another embodiment, the request may be received responsive to a user performing an analysis of TTC data (e.g., a user operating system 110). Temporal range module 510 may be configured to identify a temporal range with which a baseline distribution is to be generated. In some embodiments, the temporal range may be indicated by the baseline distribution data request. For example, in response to dynamic data being received for a particular temporal range (e.g., 2-10 seconds, one day, one week, etc.), temporal range module 510 may identify the corresponding temporal range with which to obtain stored distribution data from entity baseline distribution database 225. Temporal range module 510 may further be configured to determine an entity with which the baseline distribution is to be generated for. The entity may be specified by the request, for instance, however alternatively the entity may be indicated by the entity specific data that has been received. Database 225 may be configured to store entity baseline distribution data for one or more entities capable of being analyzed by user activity detection system 110. In some embodiments, the distribution data stored by database 225 may be raw baseline data obtained from various entities, however additionally and/or alternatively the baseline distribution data may be stored as baseline distribution data representing a baseline distribution. For example, baseline distribution models 280 may be employed to format the data into an appropriate baseline distribution, which may then be stored by database 225 for the particular entity and temporal range associated with that data.

User system platform module 520 may be configured to identify a type of platform that a particular user device, or user devices, with which the entity specific online data corresponds to. The amount of time with which it takes for a user to interact with content may vary depending on a type of device with which the user is receiving that content with. For example, the amount of time with which it may take for a user to click on an advertisement associated with an entity may be different depending on whether the user is viewing that content on a mobile device (e.g., a smart phone, tablet, etc.), or a desktop computer. Therefore, user system platform module 520 may identify the type of device that the entity specific online data is associated with, for example, and may employ that information to obtain appropriate entity baseline data from database 225 based on the user system platform (as well as the temporal range).

Baseline distribution module 530 may be configured to generate baseline distribution data representing a baseline distribution associated with a particular entity. The baseline distribution may further be associated with a particular temporal range and/or a particular device type. In some embodiments, baseline distribution module 530 may receive entity baseline data from entity baseline distribution database 225. The entity baseline data may be raw baseline data (e.g., not representing a distribution), or the entity baseline data may represent a baseline distribution, or both. If the former, however, one or more baseline distribution models 280 may also be received by baseline distribution module 530 to assist in generating the baseline distribution. Additionally, in some embodiments, binning information 540 may be received by baseline distribution module 530. Binning information 540 may indicate a binning data size to be used for the particular baseline distribution. In some embodiments, the binning size may be associated with a temporal range, and/or the binning size may be predefined, however persons of ordinary skill in the art will recognize that any suitable binning size may be used. Furthermore, the binning information may further indicate any additional parameters that are to be applied to the baseline distribution. For example, the baseline distribution may have a log-transformation applied to it and/or a multiplicative factor applied prior to any comparison being performed by distribution measure system 240. In some embodiments, as described in greater detail below, baseline distribution data representing one or more baseline distributions may be generated only for entities that have been identified to have a certain threshold level of user activity. For example, entities that have an advertisement click rate (e.g., an amount of instances of users clicking on an advertisement displayed within a webpage associated with that entity) that exceeds a click rate threshold.

Figure 5B:
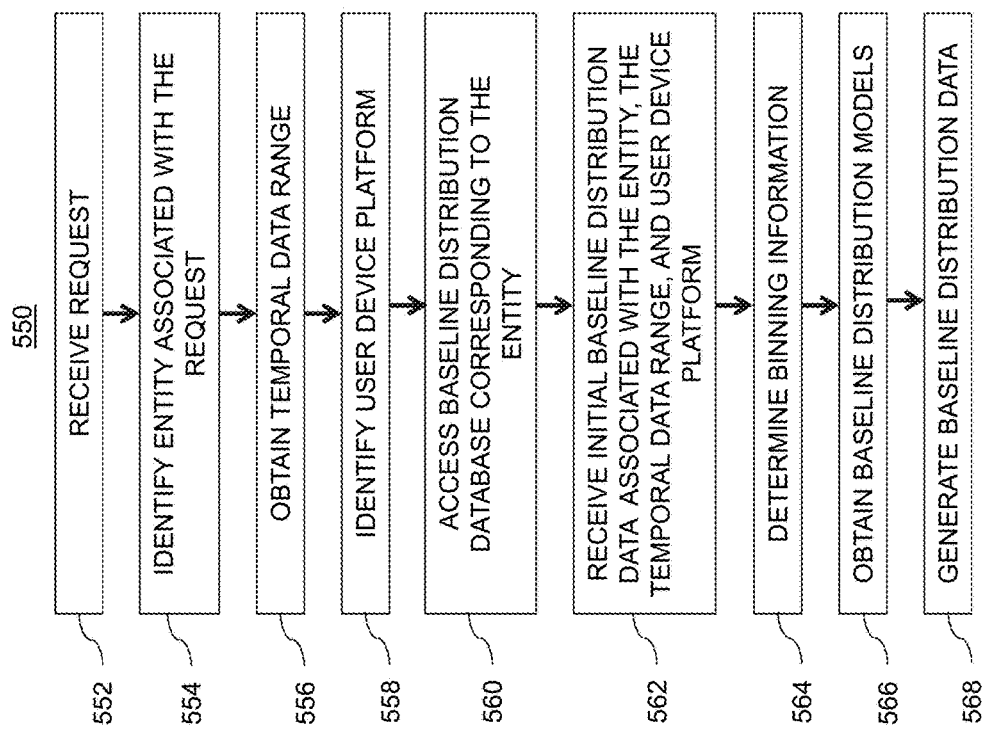
FIG. 5B is an illustrative flowchart of an exemplary process for generating baseline distribution data using the exemplary baseline distribution generation system of FIG. 5A, in accordance with various embodiments of the present teaching.

FIG. 5B is an illustrative flowchart of an exemplary process for generating baseline distribution data using the exemplary baseline distribution generation system of FIG. 5A, in accordance with various embodiments of the present teaching. Process 550, in a non-limiting embodiment, may begin at step 552. At step 552, a request may be received. For example, a request for baseline distribution data associated with a particular entity may be received by baseline distribution generation system 220. At step 554, an entity associated with the request may be identified. In some embodiments, the baseline distribution request may include an entity identified indicating the entity that one or more measures may be performed for. Alternatively, the entity identity may be obtained from the entity specific online data received by system 110.

At step 556, a temporal data range may be obtained. For instance, temporal range module 510 may determine a temporal range with which entity baseline data is to be obtained from database 225. In some embodiments, the temporal range may be indicated by the request and/or the online data received. At step 558, a user device platform may be identified. For instance, user system platform module 520 may determine a type of device (e.g., a device platform) associated with the online data received. For example, the type of device may correspond to a mobile device, a desktop computer, a smart accessory, and the like. At step 560, a baseline distribution database may be accessed corresponding to the identified entity. For example, baseline database 225 may be accessed for the particular entity identified at step 554. In some embodiments, each entity may be associated with a particular baseline database 225, however alternatively, two or more entities may have their baseline data stored by a common database.

At step 562, initial baseline distribution data associated with the entity, the temporal data range, and the user device platform may be received by baseline distribution module 530. For example, raw baseline data for a first entity, occurring during a first temporal range, associated with a first device platform, may be provided from database 225 to baseline distribution module 530. At step 564, binning information may be determined. For example, a bin size (e.g., bucket size) for the baseline data may be determined based on binning information 540. At step 566, one or more baseline distribution models 280 may be obtained for use in generating the baseline distribution. For example, baseline distribution models 280 may indicate approximate shapes and formats associated with various baseline distributions (e.g., linear distribution, exponential distribution, Gaussian distribution, etc.). At step 568, baseline distribution data representing the baseline distribution for the particular entity, temporal range, and device platform, may be generated. For instance, baseline distribution module 530 may be configured to generate the baseline distribution data.

Figure 6A:
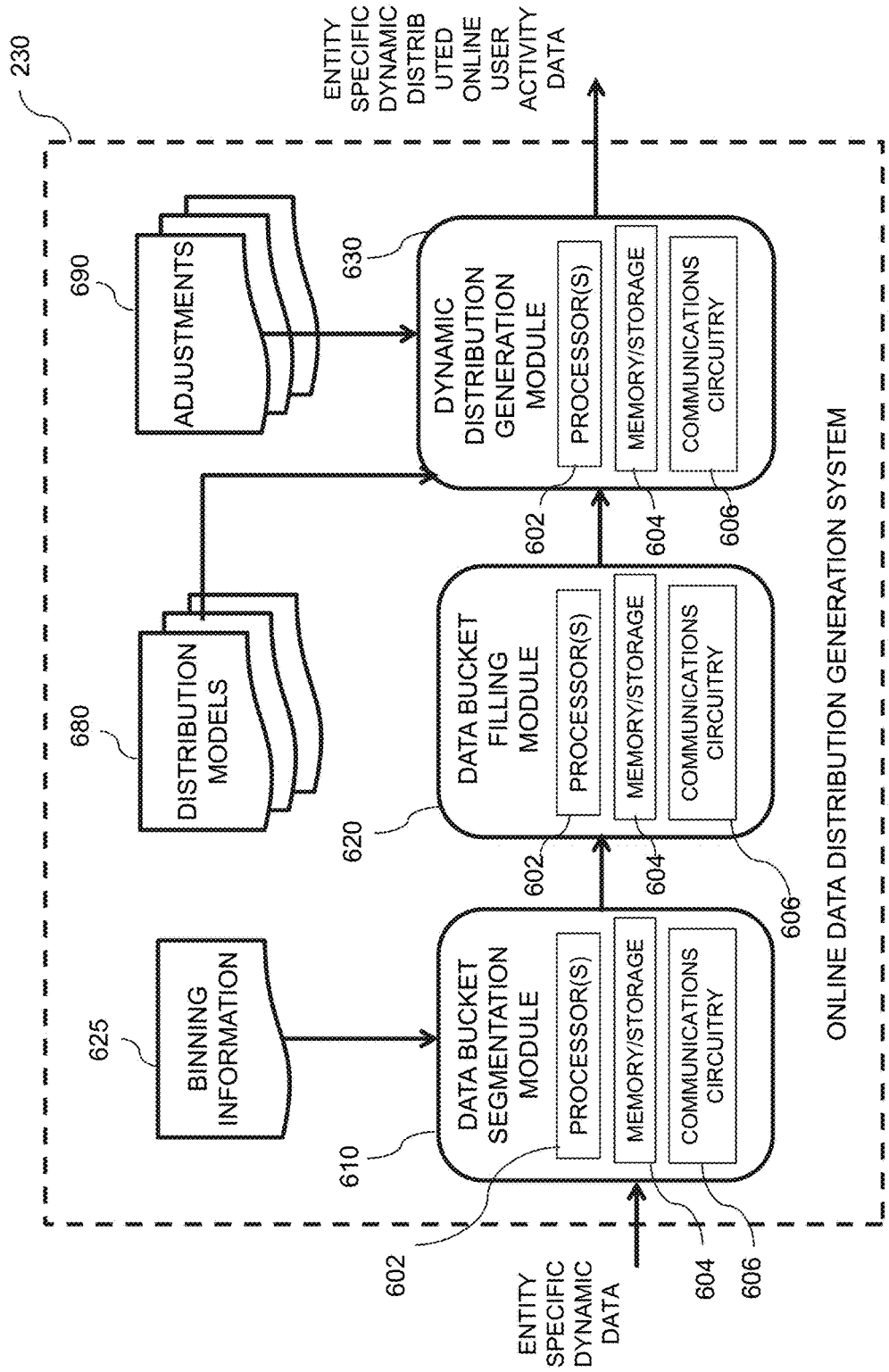
FIG. 6A is an illustrative diagram of an exemplary online data distribution system included by the user activity detection system of FIG. 2, in accordance with various embodiments of the present teaching.

FIG. 6A is an illustrative diagram of an exemplary online data distribution system included by the user activity detection system of FIG. 2, in accordance with various embodiments of the present teaching. In the non-limiting illustrative embodiment, online data distribution generation system 230 may include, amongst other features, a data bucket segmentation module 610, a data bucket filling module 620, and a dynamic distribution generation module 630. Each of data bucket segmentation module 610, data bucket filling module 620, and dynamic distribution generation module 630 may include one or more processors 602, memory/storage 604, and communications circuitry 606, amongst other components. In some embodiments, processor(s) 602, memory/storage 604, and communications circuitry 606 may be substantially similar to processor(s) 402, memory/storage 404, and communications circuitry 406, and the previous description may apply.

Data bucket segmentation module 610 may be configured to segment entity specific dynamic data into two or more data buckets. For example, each data bucket may be of a particular size, as indicated by binning information 625. Binning information 625 may indicate the size for the data bucket for the particular entity, temporal range, device platform, etc. In some embodiments, binning information 625 may be substantially similar to binning information 540, and the previous description may apply. Upon receipt of the entity specific dynamic data from online data collection system 210, data bucket segmentation module 610 may be configured to segment the entity specific dynamic data into the one or more data buckets. For instance, data bucket segmentation module 610 may be configured to generate m data buckets, each having a first bucket size.

Data bucket filling module 620 may be configured to "fill" each data bucket with data of the entity specific dynamic data based on the particular characteristics of the data. In one embodiment, the data may indicate, for one or more entities, various user activity event times (e.g., TTC). Therefore, each data bucket may be filled with data associated with a corresponding user activity event. As an illustrative, if the temporal range is 1,000 seconds, the data buckets may be segmented into 20 buckets each having a size corresponding to 50 seconds. The entity specific dynamic data may then be filled such that events occurring within 0-50 seconds are placed in a first data bucket, events occurring within 51-100 seconds are placed in a second data bucket, and so on. However persons of ordinary skill in the art will recognize that the aforementioned is merely illustrative, and any suitable bucket size, unit, and mechanism for filling, may be employed.

Dynamic distribution generation module 630 may be configured to generated entity specific dynamic distributed online user activity data based on the entity specific dynamic data, distribution models 680, and one or more adjustments 690. After the data has been filled, one or more distribution models 680 may be applied to the data to transform the data into a particular shape. For example, a log-transformation may be applied to the data to have the distribution shaped roughly Gaussian. Furthermore, in some embodiments, the one or more adjustments 690 may be applied to the data to generate the distribution data representing the distribution. As another example, a multiplicative factor may be applied to the data to obtain a desired number of buckets m.

Figure 6B:
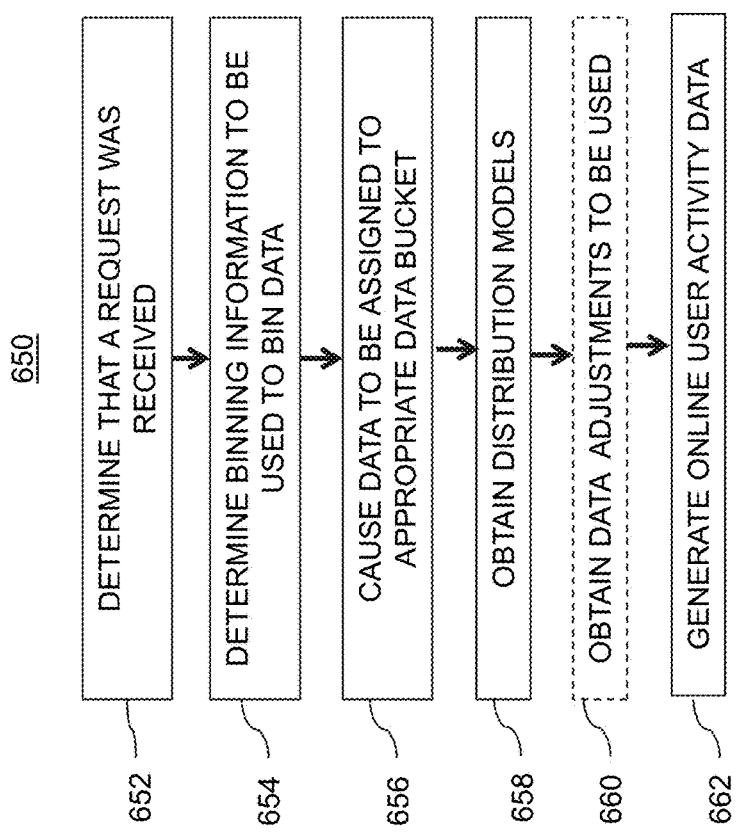
FIG. 6B is an illustrative flowchart of an exemplary process for generating online user activity data using the exemplary online data distribution system of FIG. 6A, in accordance with various embodiments of the present teaching.

FIG. 6B is an illustrative flowchart of an exemplary process for generating online user activity data using the exemplary online data distribution system of FIG. 6A, in accordance with various embodiments of the present teaching. In the non-limiting embodiment, process 650 may begin at step 652. At step 652, a determination may be made that a request was received. For instance, the request may be for determining one or more measures associated with an entity. For example, the request may be to determine whether a particular entity is experiences abnormal user activity, which could possibly indicate fraudulent behavior. In some embodiments, the request may be received by online data distribution generation system 230 from one of the various components of user activity detection system 110 and/or an entity 104.

At step 654, binning information to be used to bin data may be determined. For instance, binning information 625 may be determined, which may indicate a number of bins to be used for the online data's distribution, as well as a data size for the data bins. It should be noted that the use of the term "bin" and "bucket" may be used herein interchangeably. At step 656, data bucket filling module 620 may cause the data to be assigned to be assigned to an appropriate data bucket. For example, data associated with events occurring during a first temporal window may be placed in a first data bucket, while events occurring during a second temporal window may be placed in a second data bucket, and so on.

At step 658, one or more distribution models 680 may be obtained. Distribution models 680 may indicate a transformation and/or shape that the online activity distribution may have, and may be applied to the data to produce a distribution having a desirable shape. For example, a log-transformation may be obtained to generate a distribution that is substantially Gaussian in shape. At step 660, one or more data adjustments 690 to be used may be obtained. For example, adjustments 690 may correspond to a multiplicative factor (e.g., 4) to be applied to the data to obtain a desired number of data bins. In some embodiments, step 660 may be optional. At step 662, online user activity data may be generated. For instance, dynamic distribution generation module 630 may generate the entity specific dynamic distribution online user activity data using the entity specific dynamic data filled into the appropriate bins, and having a suitable distribution model 680 and/or adjustment 690 applied thereto.

Figure 7A:
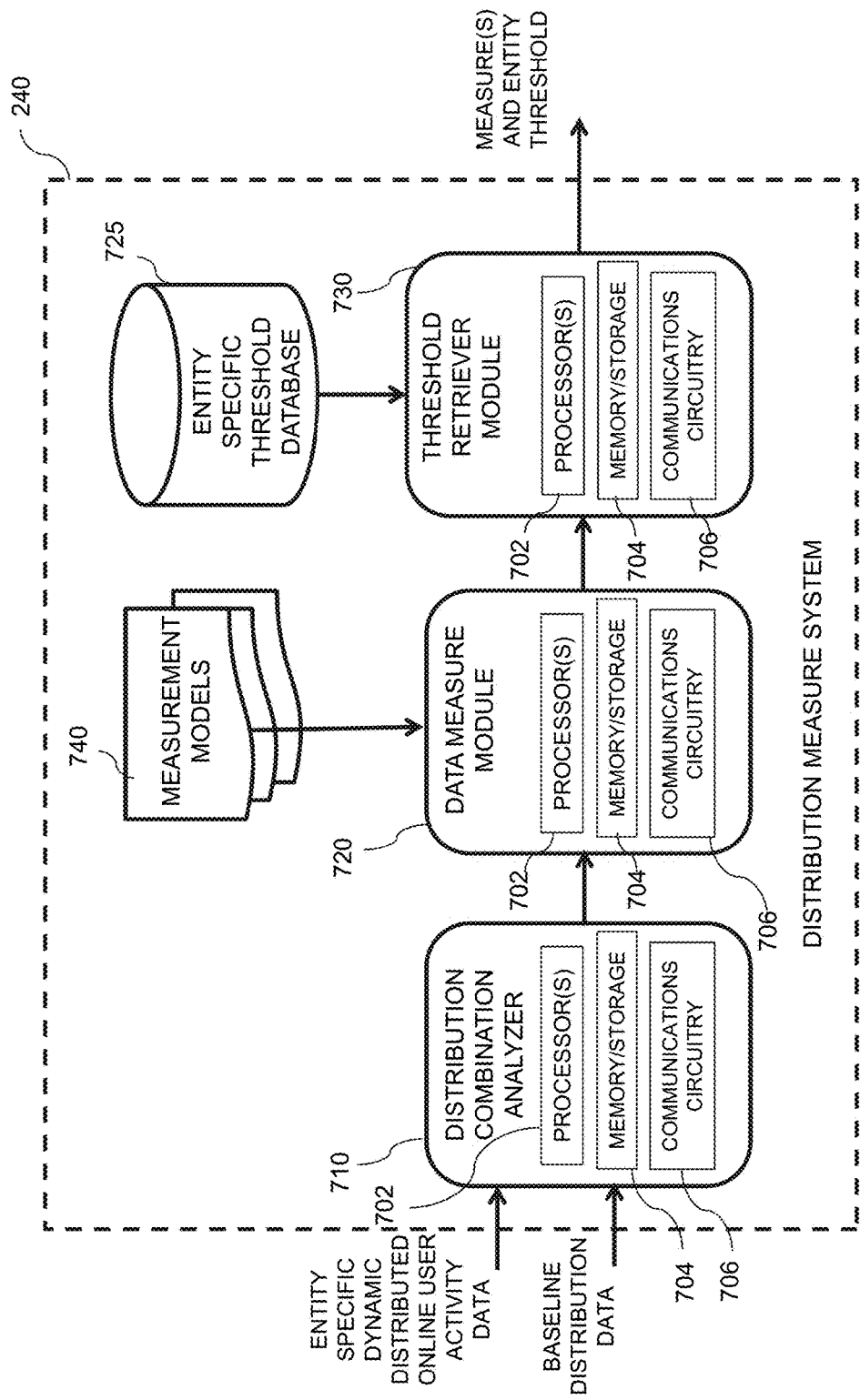
FIG. 7A is an illustrative diagram of an exemplary distribution measure system included by the user activity detection system of FIG. 2, in accordance with various embodiments of the present teaching.

FIG. 7A is an illustrative diagram of an exemplary distribution measure system included by the user activity detection system of FIG. 2, in accordance with various embodiments of the present teaching. In the non-limiting example embodiment, distribution measure system 240 may include, amongst other features, a distribution combination analyzer 710, a data measure module 720, a threshold retriever module 730, and an entity specific threshold database 725. Each of distribution combination analyzer 710, data measure module 720, and threshold retriever module 730 may include one or more processor(s) 702, memory/storage 704, and communications circuitry 706, amongst other components. In some embodiments, processor(s) 702, memory/storage 704, and communications circuitry 706 may be substantially similar to processor(s) 402, memory/storage 404, and communications circuitry 406, and the previous description may apply.

In some embodiments, distribution combination analyzer 710 may be configured to receive the entity specific dynamic distribution online user activity data from online data distribution generation system 230 as well as the baseline distribution data from baseline distribution generation system 220, and generate a combined data set including both instances of data. For example, distribution combination analyzer 710 may be configured to combine the baseline distribution data and the dynamic distribution data into a single plot.

Data measure module 720 may be configured to generate one or more data measures associated with the dynamic distribution data that has been received in relation to one or more measurement models 740 and the baseline distribution data. Measurement models 740 may include, for instance, a KS measurement and an IV measurement, however persons of ordinary skill in the art will recognize that additional or alternative measures may also be included.

As an illustrative example, a KS measure for the received distribution data may be described. For a particular entity, there may be a total number of buckets m associated with the data may be determined, and a total number of user activity events b in the baseline distribution data, and a total number of user activity events e associated with the dynamic distribution data. For example, if the entity is a sports site, then b would correspond to a total number of user interactions (e.g., clicks, taps, swipes, scrolls, etc.) in that entity (e.g., on the webpage for the sports site), while e may correspond to a total number of user interactions for a sneaker advertisement displayed within a portion of the sports site. In this particular example, a KS measure for each bucket is determined using Equation 1:

$$KS = \text{Max}\{CUMU(b\_i)/SUM_i^m(b\_i) - CUMU(e\_i)/SUM_i^m(e\_i)\} \quad \text{Equation 1.}$$

For example, for buckets 1, 2, ... m, $KS\_1 = b\_1/b - e\_1/e$; $KS\_2 = (b\_1 + b\_2)/b - (e\_1 + e\_2)/e$; $KS\_m = (b\_1 + b\_2 + ... + b\_m)/b - (e\_1 + e\_2 + ... + e\_m)/e$. Thus, KS equals the maximum of $KS\_1, KS\_2, ... KS\_m$. In Equation 1, $i=1$, m, $b\_i$ corresponds to the number of events in the i-th bucket of the baseline distribution, $e\_i$ corresponds to the number of user activity events in the dynamic distribution data, CUMU is the cumulative function, and SUM is the summation function.

As another example, an IV measure for the received distribution data may be described. In this particular example, IV may measure across an entire distribution range, accounting for the separation of two groups and the variances of the distribution. This may differ from the KS measure, described above, because the KS measure may measure a point of maximum separation of the two distributions. In this particular example, an IV measure for each bucket is determined using Equation 2:

$$IV = SUM_i^m\{(b\_i/SUM_i^m(b\_i) - e\_i/SUM_i^m(e\_i)) \times (\log(b\_i/SUM_i^m(b\_i) - \log(e\_i/SUM_i^m(e\_i)))\} \quad \text{Equation 2.}$$

For example, for buckets 1, 2, ... m, $IV\_1 = (b\_1/b - e\_1/e) \times [\log(b\_1/b) \log(e\_1/e)]$; $IV\_2 = (b\_2/b - e\_2/e) \times [\log(b\_2/b) \log(e\_2/e)]$; and $IV\_m = (b\_m/b - e\_m/e) \times [\log(b\_m/b) - \log(e\_m/e)]$. The IV measure then equals the sum of $IV\_1 + IV\_2 + ... + IV\_m$.

Threshold retriever module 730 may be configured to obtain an entity specific threshold associated with a particular entity and a particular measure from entity specific threshold database 725. For example, a first entity may have a first threshold associated with KS measures and a second threshold associated with IV measures. Based on the particular entity with which the analysis is being performed, threshold retriever module 730 may be able to access database 725 and identify and obtain the threshold or thresholds associated with that entity, which may then be output with the one or more measures that have been computed.

FIG. 7B is an illustrative flowchart of an exemplary process for generating one or more measures and obtaining an entity threshold using the exemplary distribution measure system of FIG. 7A, in accordance with various embodiments of the present teaching. Process 750 may begin, in one embodiment, at step 752. At step 752, entity specific online user activity data may be obtained. For example, entity specific online user activity data representing a dynamic distribution of user activity associated with an entity may be received by distribution combination analyzer 710. In some embodiments, the user activity data may be obtained from online distribution generation system 230, however persons of ordinary skill in the art will recognize that this is merely exemplary. For example, the online user activity data may have previously been generated and/or may be received from a separate system. At step 754, a combined data set including the entity specific online user activity data and the baseline distribution data may be generated. For instance, in addition to obtaining the online user activity, baseline distribution data representing a baseline distribution for the temporal range, device platform, and/or entity, may be received from baseline distribution generation system 220. The two data sets may then be combined using distribution combination analyzer 710.

At step 756, one or more measures may be obtained. In some embodiments, data measure module 720 may compute the one or more measures based on measurement models 740. Thus, measure(s) 740 may be obtained by data measure module 720 in order to compute the one or more measures. At step 758, data measure module 720 may perform the computation of the one or more measures using the combined data set. For example, a KS measure and/or an IV measure may be obtained based on the combined data set including the baseline distribution data and the entity specific online user activity data. The KS measure and/or the IV measure may be computed, in one embodiment, using Equations 1 and 2, respectively.

At step 760, entity specific threshold database 725 may be accessed. For instance, threshold retriever module 730 may access entity specific threshold database 725. In some embodiments, threshold database 725 may be accessed in response to data measure module 720 computing the one or more measures. At step 762, one or more entity thresholds may be obtained from threshold database 725 for the particular entity being analyzed, and for the one or more measures that have been computed. For example, a KS threshold for a first entity and an IV threshold for the first entity may be obtained by threshold retriever module 730 from threshold database 725.

Figure 8A:
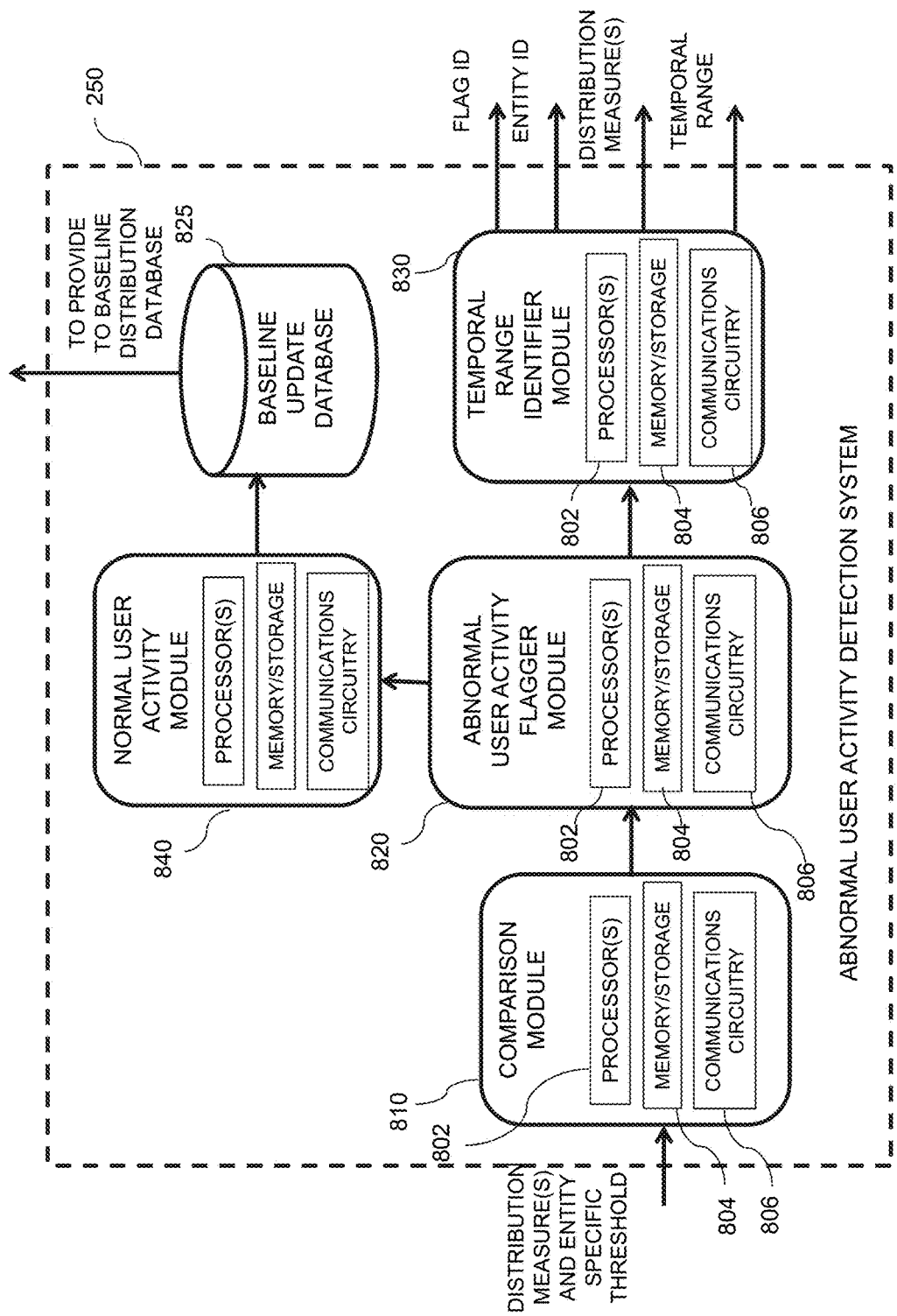
FIG. 8A is an illustrative diagram of an exemplary abnormal user activity detection system included by the user activity detection system of FIG. 2, in accordance with various embodiments of the present teaching.

FIG. 8A is an illustrative diagram of an exemplary abnormal user activity detection system included by the user activity detection system of FIG. 2, in accordance with various embodiments of the present teaching. In the non-limiting illustrative embodiment, abnormal user activity detection system 250 may include, amongst other components, a comparison module 810, an abnormal user activity flagger module 820, a normal user activity module 830, a temporal range identifier module 830, and a baseline update database 825. Each of comparison module 810, abnormal user activity flagger module 820, normal user activity module 830, and temporal range identifier module 830 may include one or more processor(s) 802, memory/storage 804, and communications circuitry 806, amongst other components. In some embodiments, processor(s) 702, memory/storage 704, and communications circuitry 706 may be substantially similar to processor(s) 402, memory/storage 404, and communications circuitry 406, and the previous description may apply.

Comparison module 810 may receive the distribution measure(s) and entity specific threshold(s) from distribution measure system 240, in some embodiments, and may be configured to compare a distribution measure with a corresponding threshold. For example, a KS measure for a first entity may be compared with a KS threshold for the first entity to determine a difference between the KS measure and the KS threshold. In some embodiments, the results of the comparison may be provided to abnormal user activity flagger module 820, which may be configured to determine whether the results indicate abnormal user activity having occurring within the entity specific online data first received by user activity detection system 110. For example, the KS measure exceeds the KS threshold for the first entity, this may indicate abnormal user activity. If abnormal user activity flagger module 820 determines that abnormal user activity had occurred, then module 820 may be configured to generate an abnormal flag identifier. For example, metadata indicating whether a corresponding user activity data represented abnormal user activity may be generated, and may also be appended to the user activity data. If, however, the comparison indicates that there is no abnormal user activity, then abnormal user activity flagger module 830 may generate a normal flag identifier. For example, metadata indicating that the user activity represents normal user activity may be generated and also may be appended to the user activity data. As an illustrative example, the flag identifier may correspond to a logical 1/0 indicating abnormal/normal user activity for a particular set of online user activity data associated with an entity.

In some embodiments, if abnormal user activity flagger module 820 determines that the online user activity data represents normal user activity, then normal user activity module 840 may retrieve the online user activity data representing the distribution and may provide it to baseline update database 825 to be stored. In some embodiments, the online user activity data may be stored by baseline update database 825 for a predefined amount of time until the analysis of additional data occurs, however this is merely exemplary. Normal user activity module 840 may be configured to provide the normal online user activity data back to baseline distribution database 225 such that the normal user activity data may be used to update/refine the baseline distribution data for that entity. In this way, user activity detection system 110 may learn and update baseline activity data based on abnormal user activity analysis. This may assist in improving future results by continually updating what "normal" user activity distributions may look like.

Temporal range identifier module 830 may be configured to determine a temporal range associated with the online user activity data that had been analyzed by abnormal user activity detection system 250. Temporal range identifier module 830 may allow further processing to be performed to the online user activity data by processing systems 270 by indicating that, in one embodiment, abnormal user activity was detected, and indicating for what temporal range that abnormal user activity was detected. For example, certain temporal ranges may have greater user activity than others. As an illustrative example, the closer it is to a holiday the more likely for there to be increased traffic flow to a webpage associated with an entity, and therefore increased user activity with an advertisement rendered thereby. Abnormal user activity detection system 250 may therefore be configured to output a flag identifier indicating whether the online user activity data was abnormal or normal, an entity identifier indicating an entity that the abnormal/normal user activity data is associated with, the one or more distribution measure(s) that had comparisons performed thereto by comparison module 810, and a temporal range associated with the user activity data that was analyzed.

Figure 8B:
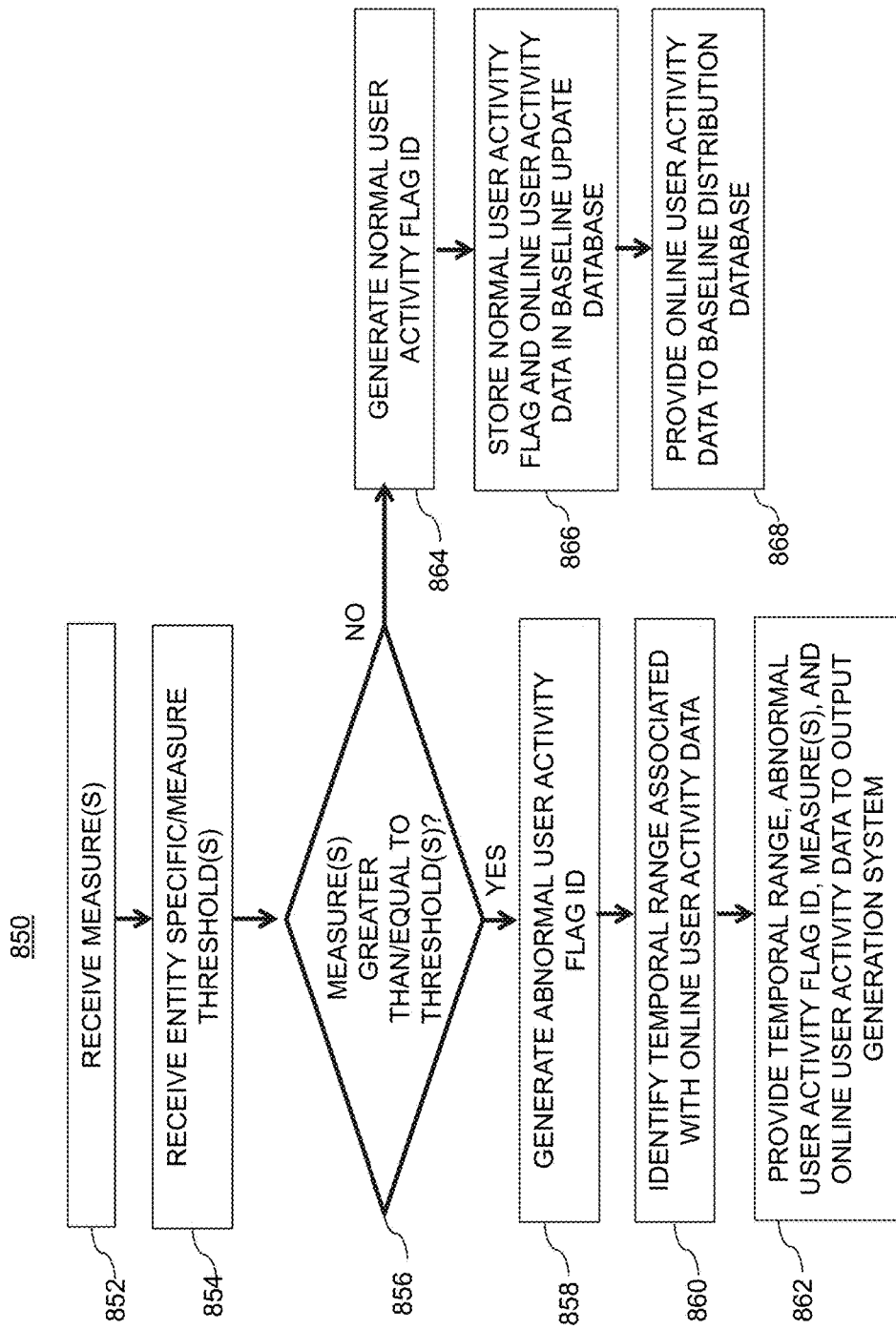
FIG. 8B is an illustrative flowchart of an exemplary process for generating an abnormal user activity flag or a normal user activity flag based on one or more measures and entity specific thresholds using the exemplary abnormal user activity detection system of FIG. 8A, in accordance with various embodiments of the present teaching.

FIG. 8B is an illustrative flowchart of an exemplary process for generating an abnormal user activity flag or a normal user activity flag based on one or more measures and entity specific thresholds using the exemplary abnormal user activity detection system of FIG. 8A, in accordance with various embodiments of the present teaching. Process 850 may, in one embodiment, begin at step 852. At step 852, one or more measures may be received. For instance, one or more measures computed by data measure module 720 may be received by abnormal user activity detection system 250. At step 854, one or more entity specific/measure thresholds may be received. For instance, one or more entity specific thresholds associated with one or more measures (e.g., KS thresholds, IV thresholds), may be received by abnormal user activity detection system 250 from threshold retriever module 730 of distribution measure system 240. At step 856, a determination may be made as to whether or not the one or more measures received is/are greater than or equal to the one or more thresholds that have been received. For instance, comparison module 810 may compare the distribution measure(s) and the entity specific threshold(s) to determine if the measure(s) equal or exceed the thresholds.

If, at step 856, comparison module 810 determines that the measure(s) exceed the threshold(s), then process 850 may proceed to step 858. At step 858, an abnormal user activity flag identifier may be generated. For instance, abnormal user activity flagger module 820 may generate the abnormal user activity flag in response to determining that the measure(s) equal or exceed the threshold(s). At step 860, a temporal range associated with the online user activity data that was determined to represent abnormal user activity may be determined. For instance, temporal range identifier module 830 may determine the temporal range associated with the online user activity data that the distribution measure(s) were computed for. At step 862, the temporal range, abnormal user activity flag identifier, measure(s), and online user activity data may be provided to output generation system 260. Output generation system 260 may be configured to package the temporal range, abnormal user activity flag identifier, measure(s), and online user activity data together into output data 204 representing a data set indicating abnormal user activity. Output generation system 260 may then send output data 204 to processing system 270, or any other device/system (e.g., entities 104) for additional analysis of the results.

If, however, at step 856, comparison module 810 determines that the measure(s) do not equal or exceed the threshold(s), then process 850 may proceed to step 864. At step 864, a normal user activity flag identifier may be generated. For example, abnormal user activity flagger module 820 may generate the normal user activity flag, and may provide the flag and the online user activity data to normal user activity module 840 and/or temporal range identifier module 830. At step 866, the normal user activity flag and the online user activity data may be stored in baseline update data 825. In some embodiments, the temporal range associated with the online user activity data may also be determined using temporal range identifier module 830, which in turn may provide the normal user activity flag identifier, online user activity data, and the temporal range information to baseline update database 825. Normal user activity module 840 may then be configured to cause baseline distribution database 225 to be provided, at step 868, with the stored normal user activity flag identifier, online user activity data, and the temporal range information to be used for updating the baseline distribution data for that entity to account for the online user activity data occurring during the temporal range.

Figure 9:
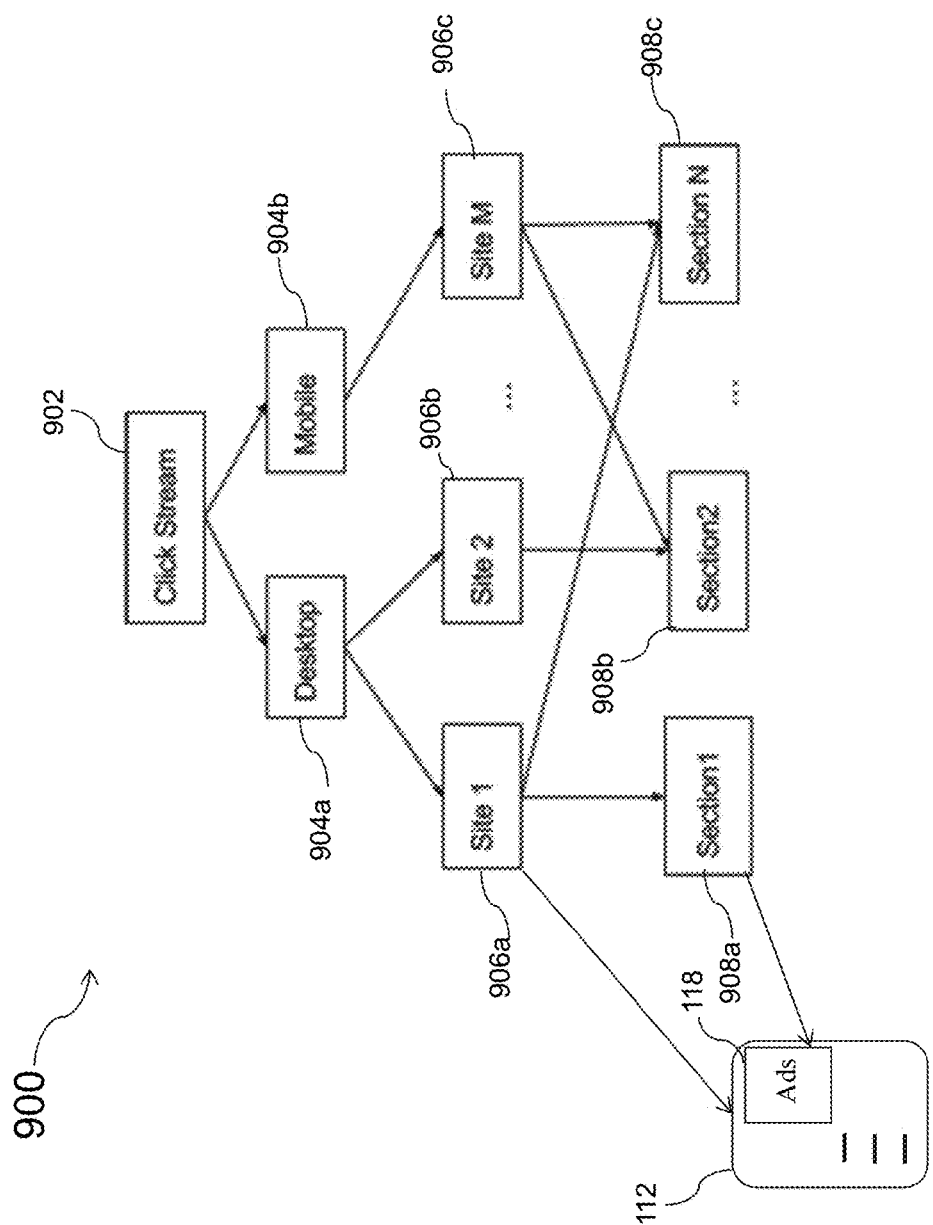
FIG. 9 is an illustrative diagram of a hierarchal click stream, in accordance with various embodiments of the present teaching.

FIG. 9 is an illustrative diagram of a hierarchal click stream, in accordance with various embodiments of the present teaching. Hierarchal click stream 900, in one embodiment, describes an exemplary user activity traffic flow for an entity. Click stream 902, in one embodiment, may correspond to the various user activity events that may occur for traffic for one or more entities. That traffic may further be distributed amongst one or more types of device platforms, such as, and without limitation, desktop platforms 904a and mobile platforms 904b.

The various platforms may each be associated with one or more websites associated with an entity. In some embodiments, some websites may be associated with one type of platform, while other websites may be associated with other platforms. For example, sites 906a and 906b may be associated with a desktop platform, whereas site 906c may be associated with a mobile platform. However, persons of ordinary skill in the art will recognize that this is merely exemplary as one site may be accessible via a desktop and a mobile, amongst other types, of platforms. Furthermore, each site may include one or more page sections. For example, website 906a may include section 908a, website 906b may include section 908b, and website 906c may include section 908c. In some embodiments, one or more sites may have similar sections. For instance, site 906a may include sections 908a and 908c. Similarly, site 906c may include sections 908b and 908c.

In some embodiments, each page section 908a-c may correspond to a portion of a website 906a-c where content (e.g., an advertisement, hyperlink, video, image, etc.) may be displayed. Different sites may also include a different number of page sections depending on a type of site, a popularity of that site, and/or any other suitable factors. For example, an entity's homepage website may include a first number of page sections, whereas an entity's corresponding sport's website may include a second number of page sections that is greater than the first number of page sections. Table 1 is an illustrative table describing the various websites of an entity and a number of page sections associated therewith.

| Entity's Website Description | Number of Page Sections |
|---|---|
| Homepage | 5 |
| News | 10 |
| Mail | 7 |
| Finance | 5 |
| Sports | 10 |

Figures 10A, 10B:
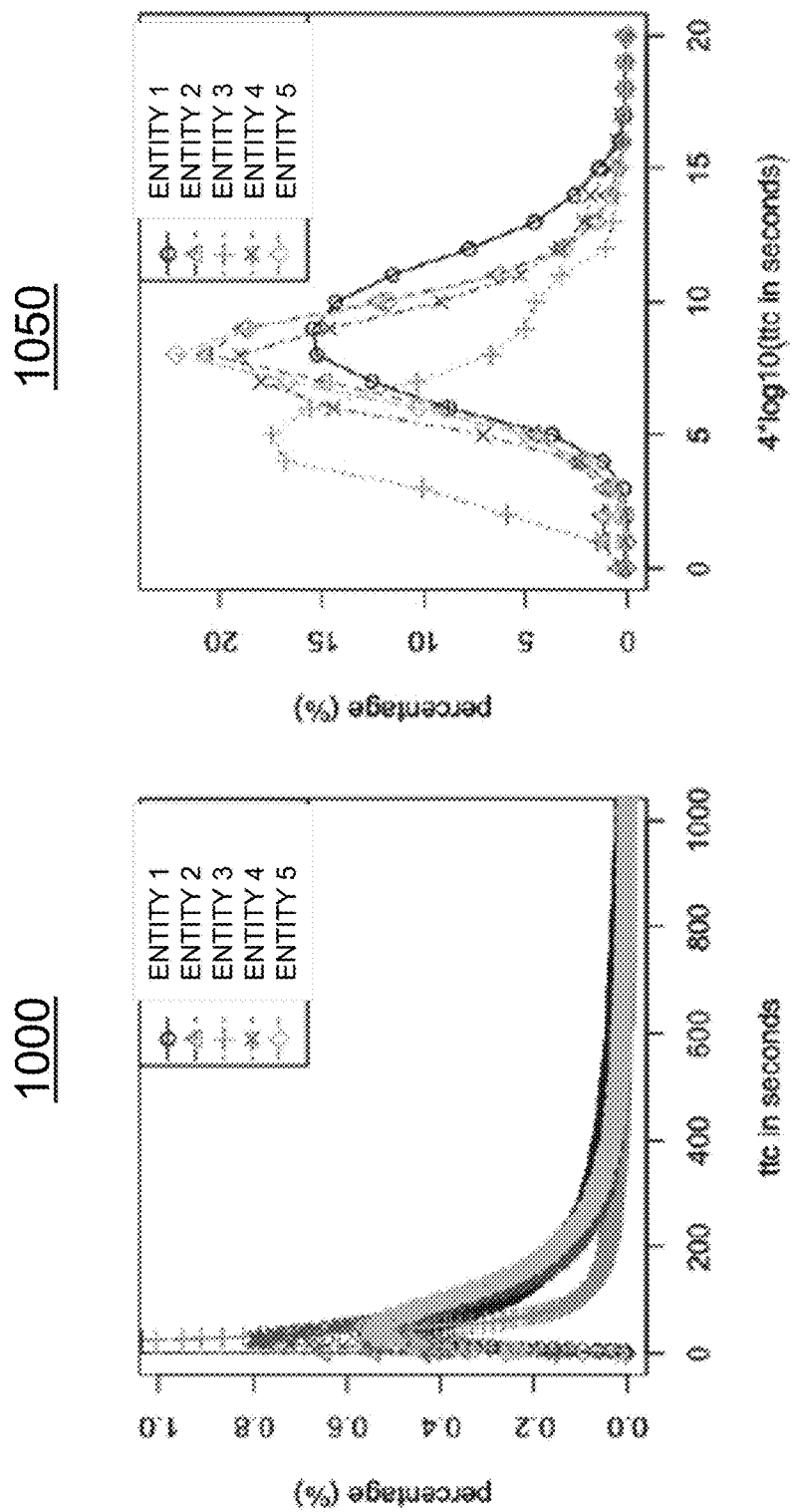
FIGS. 10A and 10B are illustrative graphs representing entity distributions of Time-To-Click ("TTC") data for various entities, in accordance with various embodiments of the present teaching.

FIGS. 10A and 10B are illustrative graphs representing entity distributions of Time-To-Click ("TTC") data for various entities, in accordance with various embodiments of the present teaching. Graph 1000 of FIG. 10A may, in one embodiment, correspond to user activity data representing a user activity distribution without any distribution models 680, described in greater detail above with reference to FIGS. 6A and 6B, applied thereto. Graph 1050 of FIG. 10B, however, may correspond to user activity data representing a user activity distribution having one or more distribution models 680 and/or adjustments 690 applied thereto. For example, graph 1050 may be substantially similar to graph 1000 with the exception that the data representing graph 1050 may have had a log-10 transformation applied to the x-axis and multiplied by a first factor (e.g., the number 4). Thus, the distributions of entities 1-5 in graph 1000 may appear to be more Gaussian in form in graph 1050 due to the transformation. Additionally, the adjustment factor applied may redistribute the number of data buckets such that there are 20 buckets.

Figures 11A, 11B:
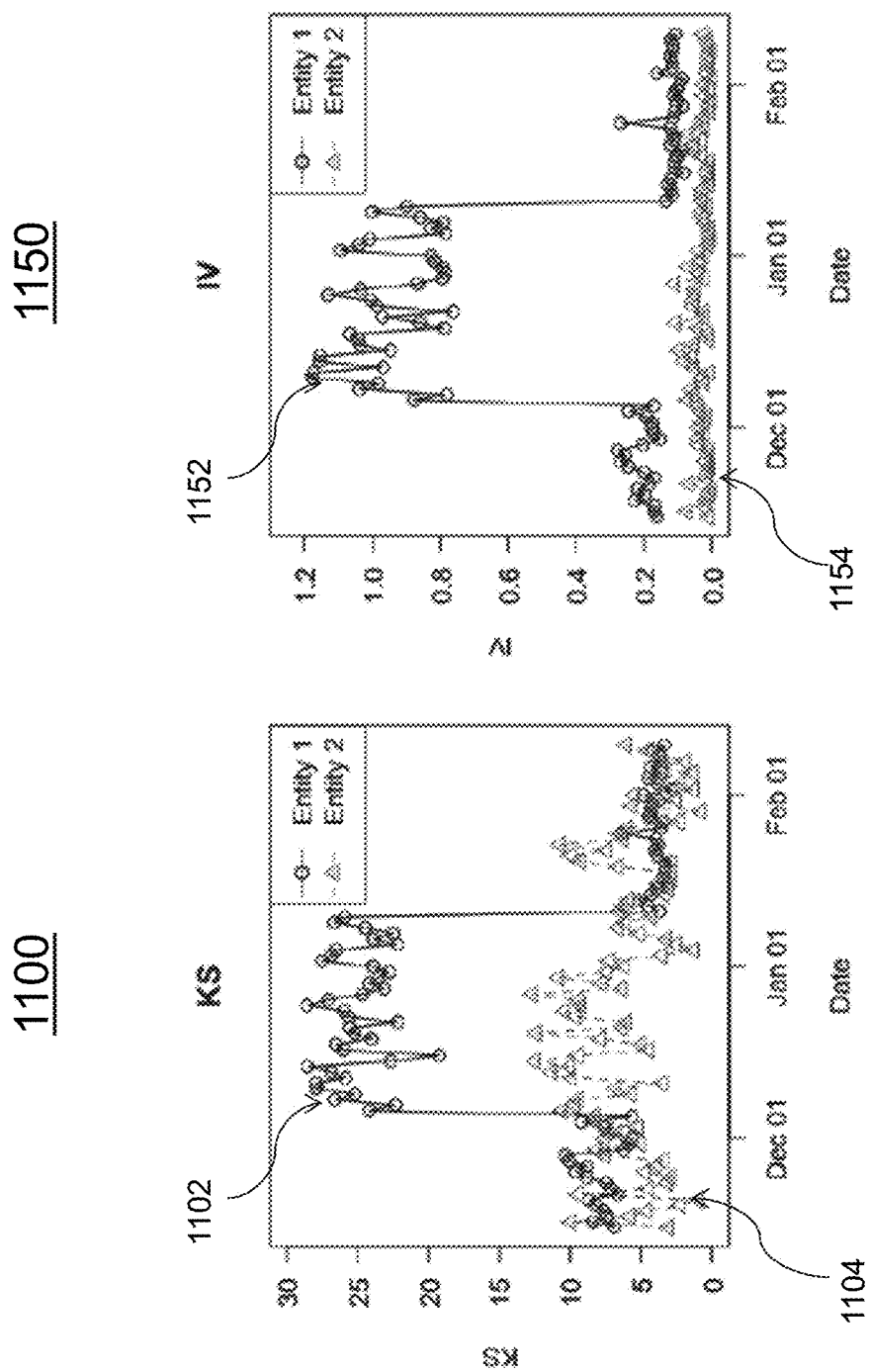
FIGS. 11A and 11B are illustrative graphs representing various abnormal behavior detection mechanisms, in accordance with various embodiments of the present teaching.

FIGS. 11A and 11B are illustrative graphs representing various abnormal behavior detection mechanisms, in accordance with various embodiments of the present teaching. Graph 1100 is an exemplary graph describing two KS measures for two separate entities, entity 1 and entity 2. For instance, data points 1102 may correspond to KS measures for entity 1 during a particular temporal range, indicated by along the x-axis of graph 1100, and data points 1104 may correspond to KS measures for entity 2 during the temporal range. As evident from graph 1100, entity 1 may have experienced abnormal user activity during a subset of time, whereas entity 2 may have experience normal user activity during that time. If, for example, the threshold for KS measures for both entities 1 and 2 were set at KS=18, then user activity detection system 110 may determine that during the temporal period starting on December 6, entity 1 detected abnormal user activity, as data points 1102 associated with entity 1 at that time, and ending approximately at January 6, were greater than or equal to the KS threshold (e.g., KS=18). This is in contrast to entity 2 where, for the same KS threshold, no data points 1104 equaled or exceeded the KS threshold.

Similarly, IV measures for the same two entities, entity 1 and entity 2, during the same temporal range, may be described by graph 1150. If, for example, the IV threshold for both entities 1 and 2 was set at IV=0.6, then during approximately the same temporal range (e.g., approximately December 6 to January 6), abnormal user activity may have been detected for entity 1, and normal user activity may have been detected for entity 2. For instance, data points 1152 for entity 1 beginning on approximately December 6 may be equal to or exceed an IV threshold of IV=0.6, whereas data points 1154 for entity 2, beginning at the same time, may be less than the IV threshold.

Figure 12:
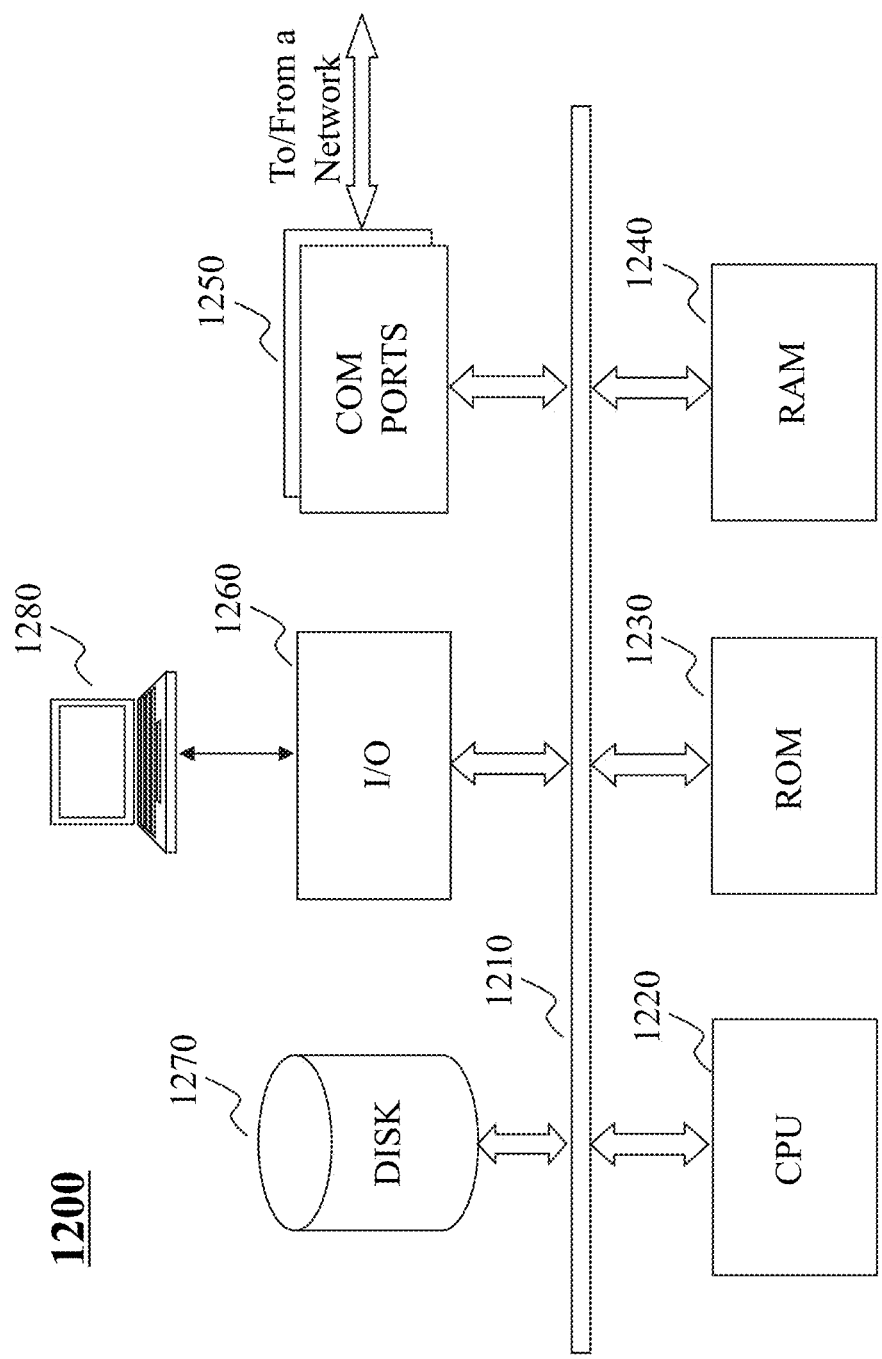
FIG. 12 is an illustrative diagram of an exemplary computing system architecture, in accordance with various embodiments of the present teaching.

FIG. 12 is an illustrative diagram of an exemplary computing system architecture, in accordance with various embodiments of the present teaching. Such a specialized system incorporating the present teaching has a functional block diagram illustration of a hardware platform which includes user interface elements. Computer 1200 may be a general purpose computer or a special purpose computer. Both can be used to implement a specialized system for the present teaching. Computer 1800 may be used to implement any component of the user activity detection system, as described herein. For example, the user activity detection system 110 may be implemented on a computer such as computer 1200 via its hardware, software program, firmware, or a combination thereof. Although only one such computer is shown, for convenience, the computer functions relating to user activity detection systems for detecting abnormal user activity described herein may be implemented in a distributed fashion on a number of similar platforms, to distribute the processing load.

Computer 1800, for example, may include COM ports 1250 connected to and from a network connected thereto to facilitate data communications. Computer 1200 also includes a central processing unit (CPU) 1220, in the form of one or more processors, for executing program instructions. For example, CPU 1220 may include one or more processors such as those described by processor(s) 402. The exemplary computer platform may also include an internal communication bus 1210, program storage and data storage of different forms (e.g., disk 1270, read only memory (ROM) 1230, or random access memory (RAM) 1240), for various data files to be processed and/or communicated by computer 1200, as well as possibly program instructions to be executed by CPU 1220. For instance, one or more of memory/storage 404 may be included by ROM 1230 and/or RAM 1240, as described in greater detail above. Computer 1200 may also include an I/O component 1260 supporting input/output flows between the computer and other components therein such as user interface elements 1280. Computer 1200 may also receive programming and data via network communications, such as via communications circuitry similar to communications circuitry 406 described in greater detail above.

Hence, aspects of the methods of detecting abnormal user activity associated with an entity, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of abnormal user activity processing operator or other abnormal user activity detection system into the hardware platform(s) of a computing environment or other system implementing a computing environment or similar functionalities in connection with abnormal user activity detection. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the abnormal user activity detection system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for detecting abnormal online user activities, the method being implemented on a computer comprising at least one processor, storage, and communications circuitry, the method comprising:

obtaining, by the at least one processor, baseline distribution data representing a baseline distribution characterizing normal user activities with respect to a first entity;

receiving, dynamically, first information related to online user activities with respect to the first entity;

determining first distribution data representing a first dynamic distribution based, at least in part, on the first information;

computing, using the baseline distribution data and the first distribution data, at least one measure characterizing a difference between the baseline distribution and the first dynamic distribution;

assessing in real-time whether the first information indicates abnormal user activity behavior based, at least in part, on the at least one measure, wherein the abnormal user activity behavior is identified by detecting time-to-click ("TTC") abnormalities, which includes a duration between when an advertisement is rendered and when a user clicks on the advertisement, and wherein the abnormal user activity behavior signifies fraudulent activities by at least one of a bot or fake user clicks; and generating, in response to determining that the first information indicates that first distribution data comprises a first indication of the abnormal user activity behavior, first output data comprising at least the first distribution data and the at least one measure.

2. The method of claim 1, further comprising:
sending the first output data to a quality assurance processor system to determine at least one additional property associated with the first dynamic distribution.

3. The method of claim 1, wherein receiving, dynamically, the first information further comprises:
receiving online user activity data representing a plurality of online user activity events associated with the first entity during a first amount of time.

4. The method of claim 1, wherein obtaining the baseline distribution data further comprises at least one of:
receiving the baseline distribution data from a baseline distribution database, the baseline distribution database being configured to store first baseline data associated with at least one first temporal duration for at least one entity; and
generating the baseline distribution data using online user activity data representing online user activity events associated with the first entity during a second temporal duration.

5. The method of claim 1, wherein computing the at least one measure further comprises at least one of:
performing a Kolmogorov-Smirnov measure; and
performing an Information Value measure.

6. The method of claim 1, wherein assessing in real-time whether the first information indicates the abnormal user activity behavior further comprises:
determining, by the at least one processor, a first threshold associated the abnormal user activity for the first entity; and
determining that the at least one measure exceeds the first threshold.

7. The method of claim 1, further comprising:
receiving, dynamically, second information related to second online user activities with respect to the first entity;
determining second distribution data representing a second dynamic distribution based, at least in part, on the second information;
computing, using the baseline distribution data and the second distribution data, at least one second measure characterizing a second difference between the baseline distribution and the second dynamic distribution;
determining that the second information indicates that the second distribution data comprises a second indication of normal user activity behavior;
storing that the second distribution data in a baseline distribution database; and
generating updated baseline distribution data representing an updated baseline distribution with respect to the first entity based, at least in part, on the baseline distribution data and the second distribution data.

8. The method of claim 7, further comprising:
receiving, dynamically, third information related to third online user activities with respect to the first entity;
determining third distribution data representing a third dynamic distribution based, at least in part, on the third information; and
determining, based at least in part on at least one third measure characterizing a third difference between the updated baseline distribution and the third dynamic distribution, the at least one third measure being computed using the updated baseline distribution data and the third distribution data that the third distribution data comprises one of the first indication or the second indication.

9. The method of claim 1, wherein generating the output data further comprises:
determining temporal information indicating a temporal range associated with the online user activities; and
generating an abnormal user activity flag identifier such that the output data further comprises the temporal information and the abnormal user activity flag identifier.

10. A system for detecting abnormal online user activities, the system comprising:
a baseline distribution generation system configured to obtain baseline distribution data representing a baseline distribution characterizing normal user activities with respect to a first entity;
an online data collection system configured to receive, dynamically, first information related to online user activities with respect to the first entity;
an online data distribution generation system configured to determine first distribution data representing a first dynamic distribution based, at least in part, on the first information;
a distribution measure system configured to compute, using the baseline distribution data and the first distribution data, at least one measure characterizing a difference between the baseline distribution and the first dynamic distribution;
an abnormal user activity detection system configured to assess in real-time whether the first information indicates abnormal user activity behavior based, at least in part, on the at least one measure, wherein the abnormal user activity behavior is identified by detecting time-to-click ("TTC") abnormalities, which includes a duration between when an advertisement is rendered and when a user clicks on the advertisement, and wherein the abnormal user activity behavior signifies fraudulent activities by at least one of a bot or fake user clicks; and
an output data generation system configured to generate, in response to determining that the first information indicates that first distribution data comprises a first indication of the abnormal user activity behavior, first output data comprising at least the first distribution data and the at least one measure.

11. The system of claim 10, wherein the output data generation system is further configured to:
the first output data to a quality assurance processor system to determine at least one additional property associated with the first dynamic distribution.

12. The system of claim 10, wherein the online data collection system is further configured to:
receive online user activity data representing a plurality of online user activity events associated with the first entity during a first amount of time.

13. The system of claim 10, wherein the user activity detection system further comprises:
at least one baseline distribution database configured to store to store first baseline data associated with at least one first temporal duration for at least one entity, wherein the baseline distribution data being obtained further comprises the baseline distribution generation system being configured to one of:
receive the baseline distribution data from a baseline distribution database; and
generate the baseline distribution data using online user activity data representing online user activity events associated with the first entity during a second temporal duration.

14. The system of claim 10, wherein the distribution measure system being configured to compute the at least one measure comprises the distribution measure system being configured to at least one of:

perform a Kolmogorov-Smirnov measure; and perform an Information Value measure.

15. The system of claim 10, wherein the abnormal user activity detection system being configured to assess in real-time whether the first information indicates the abnormal user activity behavior comprises the abnormal user activity detection system being further configured to:

determine a first threshold associated the abnormal user activity for the first entity; and determine that the at least one measure exceeds the first threshold.

16. The system of claim 10, wherein:

the online data collection system is further configured to receive, dynamically, second information related to second online user activities with respect to the first entity;

the online data distribution generation system is further configured to determine second distribution data representing a second dynamic distribution based, at least in part, on the second information;

the distribution measure system is further configured to compute, using the baseline distribution data and the second distribution data, at least one second measure characterizing a second difference between the baseline distribution and the second dynamic distribution;

the abnormal user activity detection system is further configured to determine that the second information indicates that the second distribution data comprises a second indication of normal user activity behavior;

the user activity detection system further comprises a baseline distribution database configured to store the second distribution data; and the baseline distribution generation system is further configured to generate updated baseline distribution data representing an updated baseline distribution with respect to the first entity based, at least in part, on the baseline distribution data and the second distribution data.

17. The system of claim 16, wherein:

the online data collection system is further configured to receive, dynamically, third information related to third online user activities with respect to the first entity;

the online data distribution generation system is further configured to determine third distribution data representing a third dynamic distribution based, at least in part, on the third information; and the distribution measure system is further configured to determine, based at least in part on at least one third measure characterizing a third difference between the updated baseline distribution and the third dynamic distribution, the at least one third measure being computed using the updated baseline distribution data and the third distribution data that the third distribution data comprises one of the first indication or the second indication.

18. The system of claim 10, wherein the abnormal user activity detection system further comprises:

a temporal range identifier module configured to determine temporal information indicating a temporal range associated with the online user activities; and an abnormal user activity flagger module configured to generate an abnormal user activity flag identifier such that the output data further comprises the temporal information and the abnormal user activity flag identifier.

19. The system of claim 10, wherein the abnormal user activity detection system further comprises:

an abnormal user activity flagger module configured to determine that second information related to additional online user activities with respect to a second entity indicates normal user activity behavior; and a baseline update database configured to store second dynamic distribution data representing a second dynamic distribution based on the second information.

20. A non-transitory computer readable medium having information recorded thereon for detecting abnormal online user activity, wherein the information, when read by the computer, causes the computer to:

obtain baseline distribution data representing a baseline distribution characterizing normal user activities with respect to a first entity;

receive, dynamically, first information related to online user activities with respect to the first entity;

determine first distribution data representing a first dynamic distribution based, at least in part, on the first information;

compute, using the baseline distribution data and the first distribution data, at least one measure characterizing a difference between the baseline distribution and the first dynamic distribution;

assess in real-time whether the first information indicates abnormal user activity behavior based, at least in part, on the at least one measure, wherein the abnormal user activity behavior is identified by detecting time-to-click ("TTC") abnormalities, which includes a duration between when an advertisement is rendered and when a user clicks on the advertisement, and wherein the abnormal user activity behavior signifies fraudulent activities by at least one of a bot or fake user clicks; and generate, in response to determining that the first information indicates that first distribution data comprises a first indication of the abnormal user activity behavior, first output data comprising at least the first distribution data and the at least one measure.

* * * * *